(12) United States Patent
Yagyu et al.

(10) Patent No.: US 7,227,706 B2
(45) Date of Patent: Jun. 5, 2007

(54) IMAGE-TAKING LENS APPARATUS

(75) Inventors: Genta Yagyu, Nishinomiya (JP); Shinji Yamaguchi, Osaka (JP); Kenji Konno, Sakai (JP); Kaori Kojima, Kobe (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/029,332

(22) Filed: Jan. 5, 2005

(65) Prior Publication Data

US 2005/0259329 A1 Nov. 24, 2005

(30) Foreign Application Priority Data

May 24, 2004 (JP) ............................. 2004-153091

(51) Int. Cl.
*G02B 17/00* (2006.01)
*G02B 15/14* (2006.01)

(52) U.S. Cl. .................. 359/737; 359/676; 359/680; 359/686; 359/833; 396/72; 396/379; 396/384; 396/76; 396/82; 396/85; 396/544

(58) Field of Classification Search ........ 359/676–692, 359/737, 833; 396/72, 379, 384, 76–79, 396/82, 85, 544
See application file for complete search history.

(56) References Cited

U.S. PATENT DOCUMENTS 6,754,446 B2* 6/2004 Hagimori et al. ........... 359/676
6,771,432 B2* 8/2004 Mihara ....................... 359/687
6,995,922 B2* 2/2006 Mihara et al. .............. 359/689
7,037,005 B2* 5/2006 Kreger et al. ............... 396/544
2004/0027685 A1* 2/2004 Mihara et al. .............. 359/686
2004/0062535 A1* 4/2004 Hagimori et al. ............ 396/72
2005/0073751 A1* 4/2005 Mihara ....................... 359/680

FOREIGN PATENT DOCUMENTS

| JP | 2000-131610 A | 5/2000 |
| JP | 2003-043354 A | 2/2003 |
| JP | 2003-098430 A | 4/2003 |
| JP | 2003-107356 A | 4/2003 |

OTHER PUBLICATIONS

Kaye&Laby:Tables of Physical & Chemical Constants, National Physical Laboratory, subsection 2.5.8 Refractive index of optical materials (page 9 of subsection), 1991 (according to references used).*

Photonics Handbook, Optical Materials: Transmission and Refractive Index, p. 6, 2006.*

* cited by examiner

*Primary Examiner*—Evelyn A. Lester
(74) *Attorney, Agent, or Firm*—Sidley Austin LLP

(57) ABSTRACT

An image-taking lens apparatus has an image sensor for converting an optical image of a subject into an electrical signal and an image-taking lens system for forming the optical image on the image sensor. The image-taking lens system includes a prism for bending the optical path, and the refractive index of the prism fulfills a prescribed conditional formula.

18 Claims, 27 Drawing Sheets

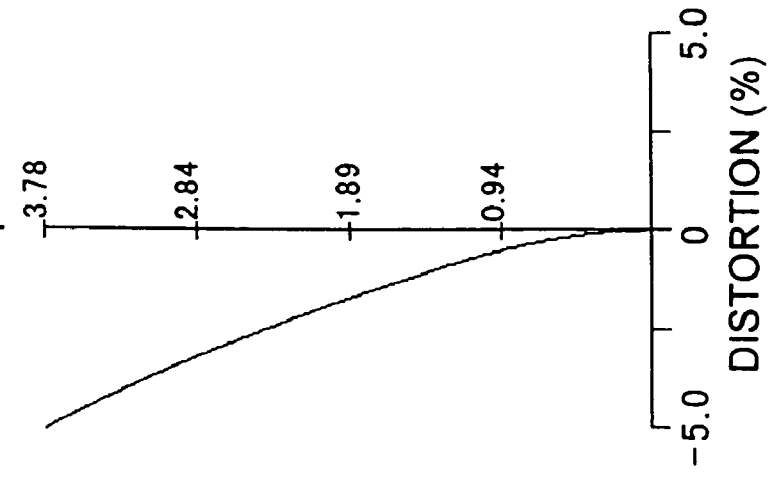
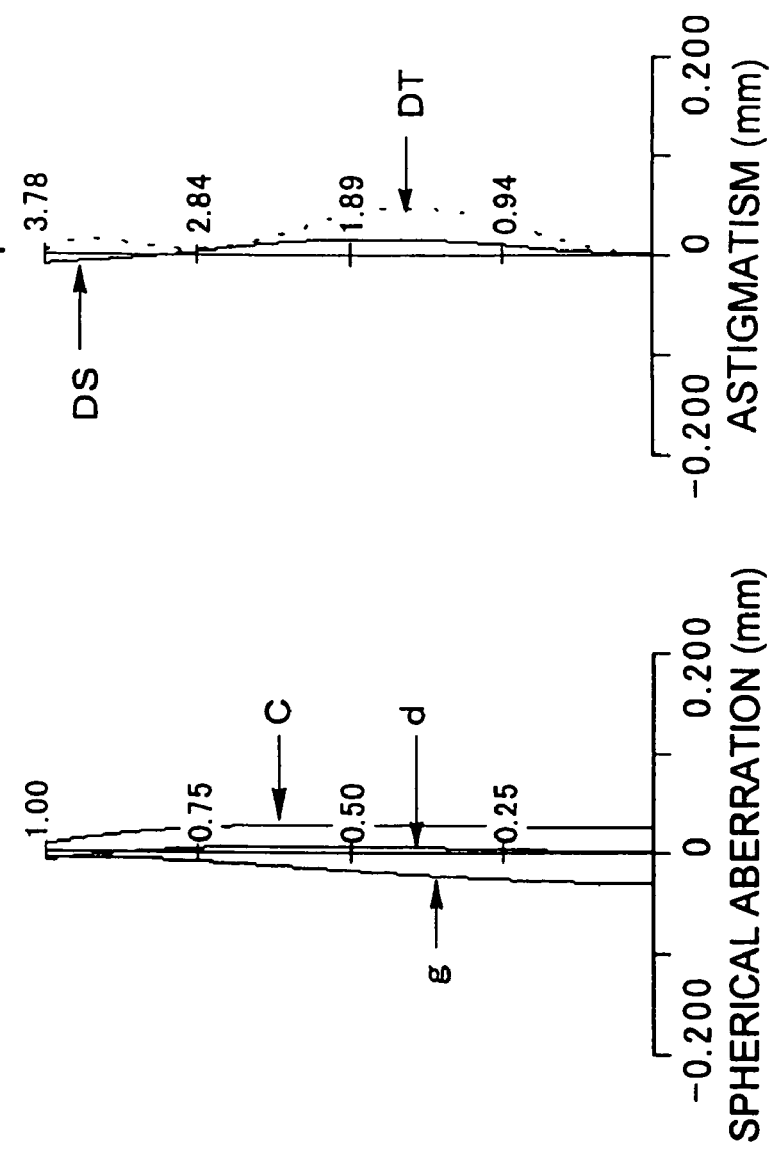

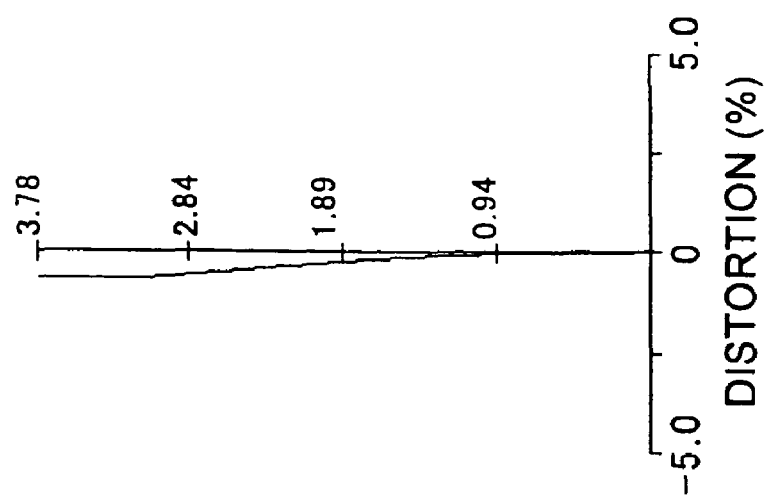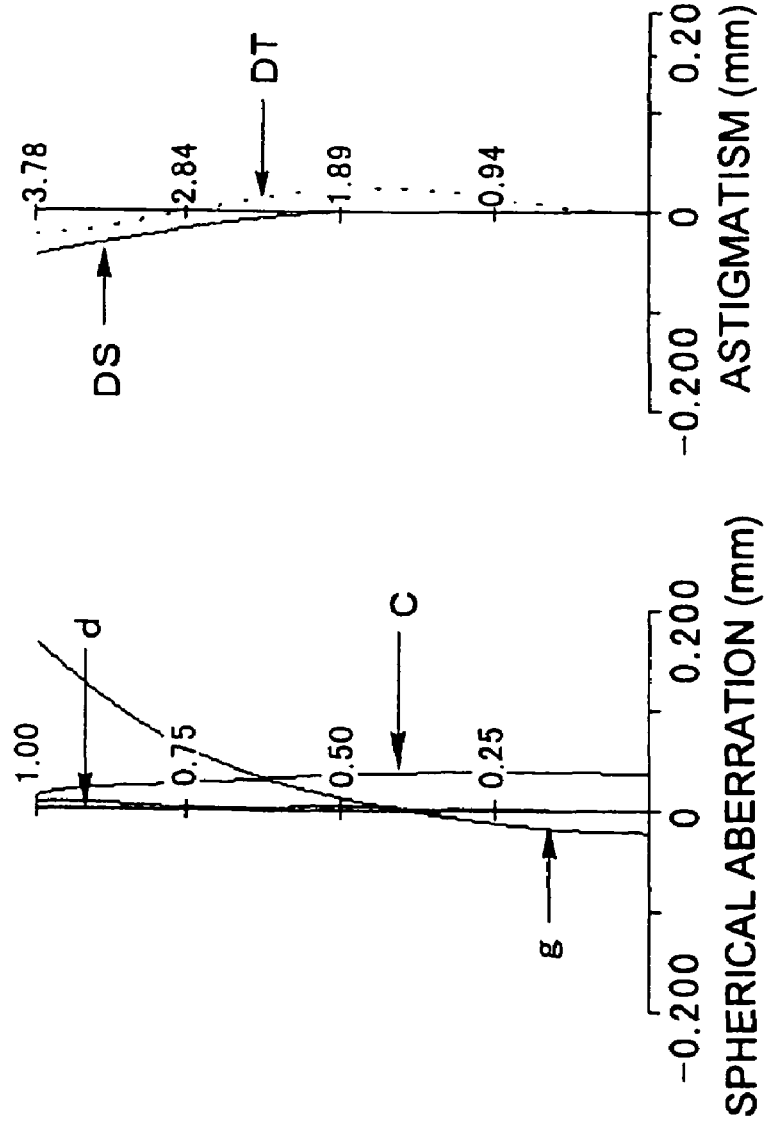

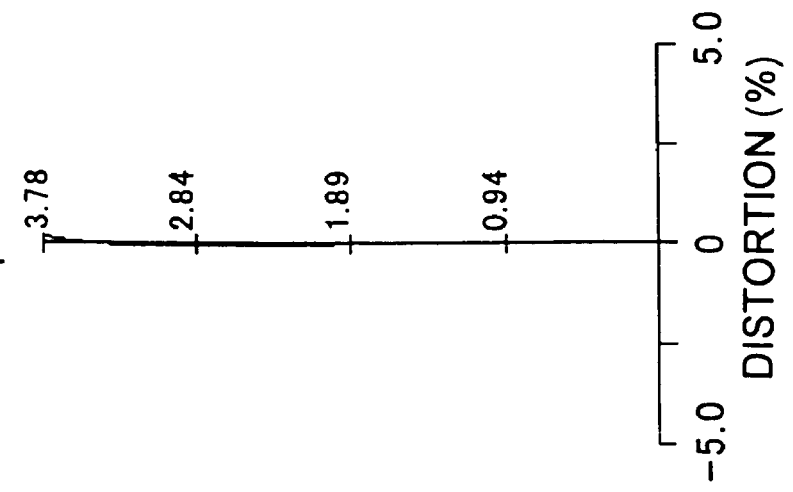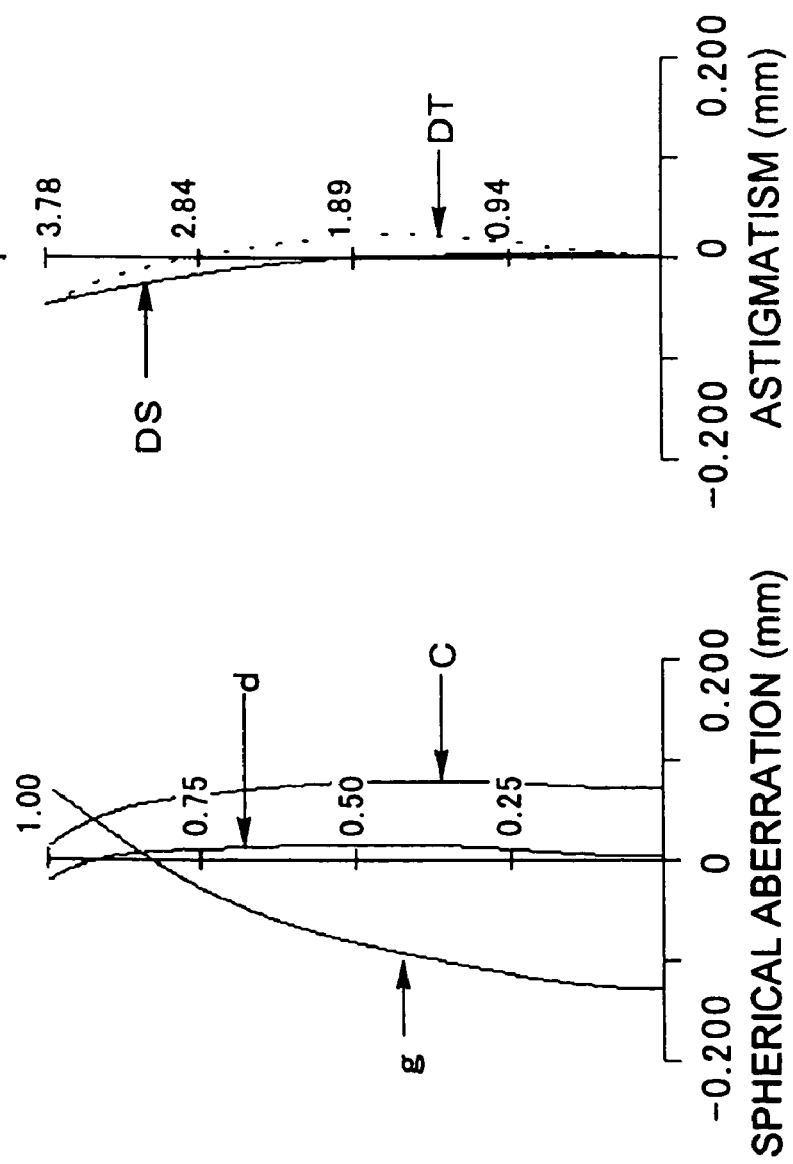

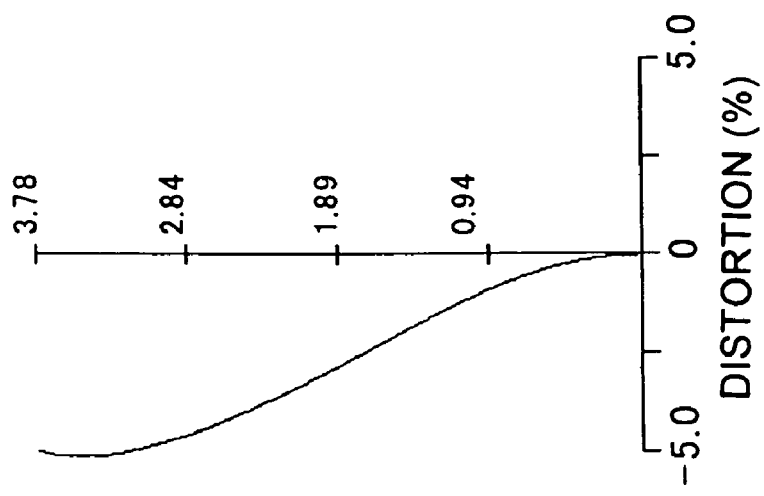
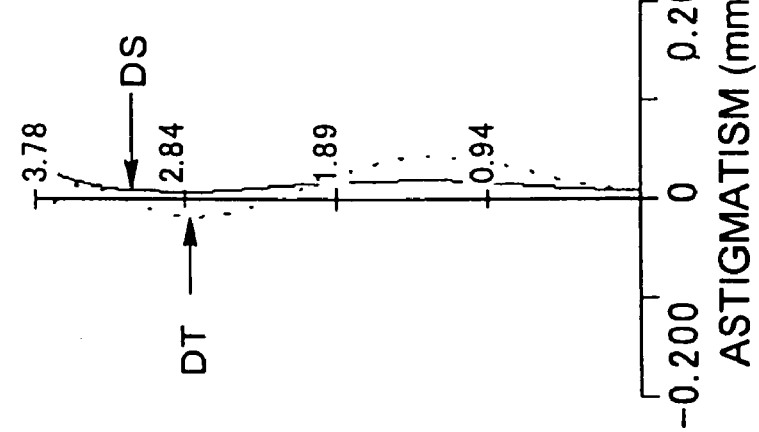
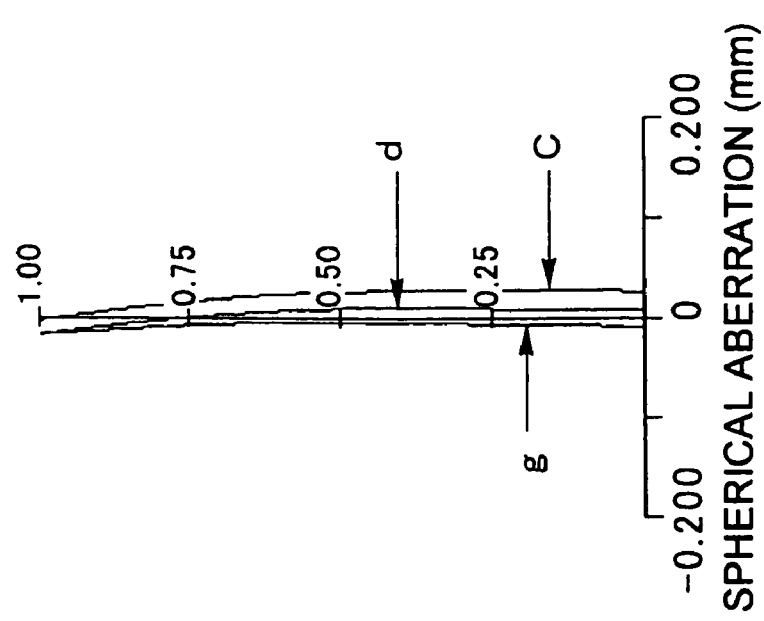

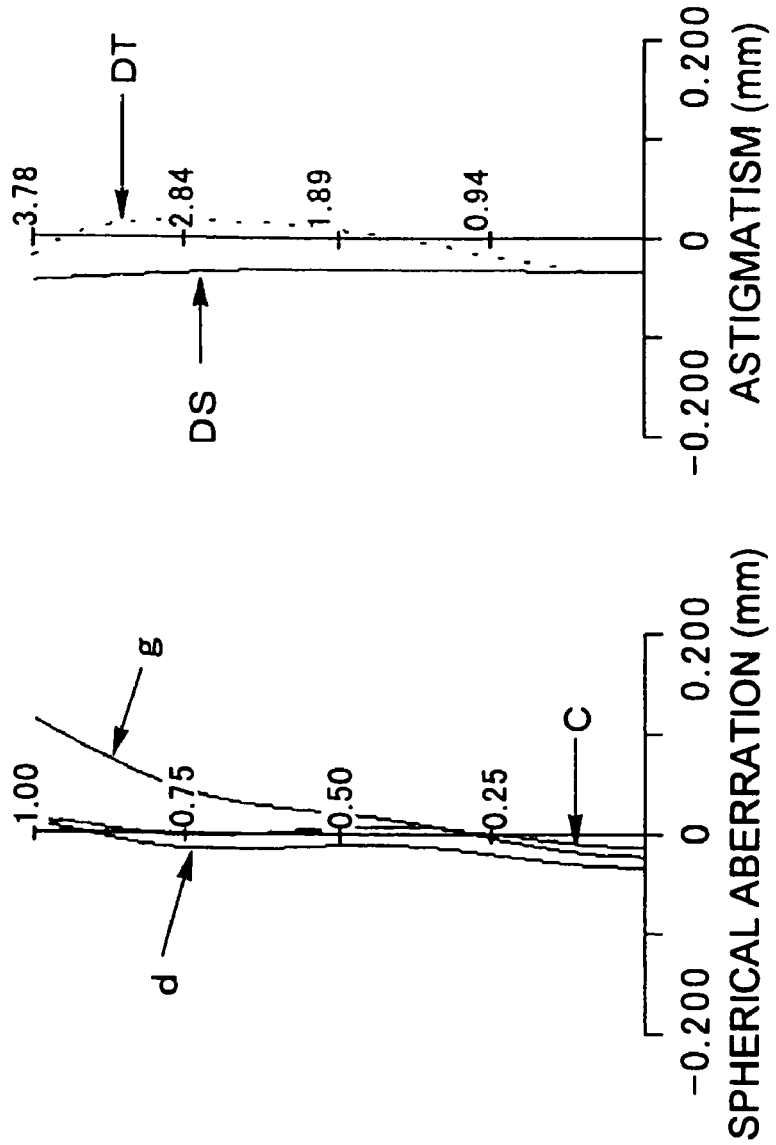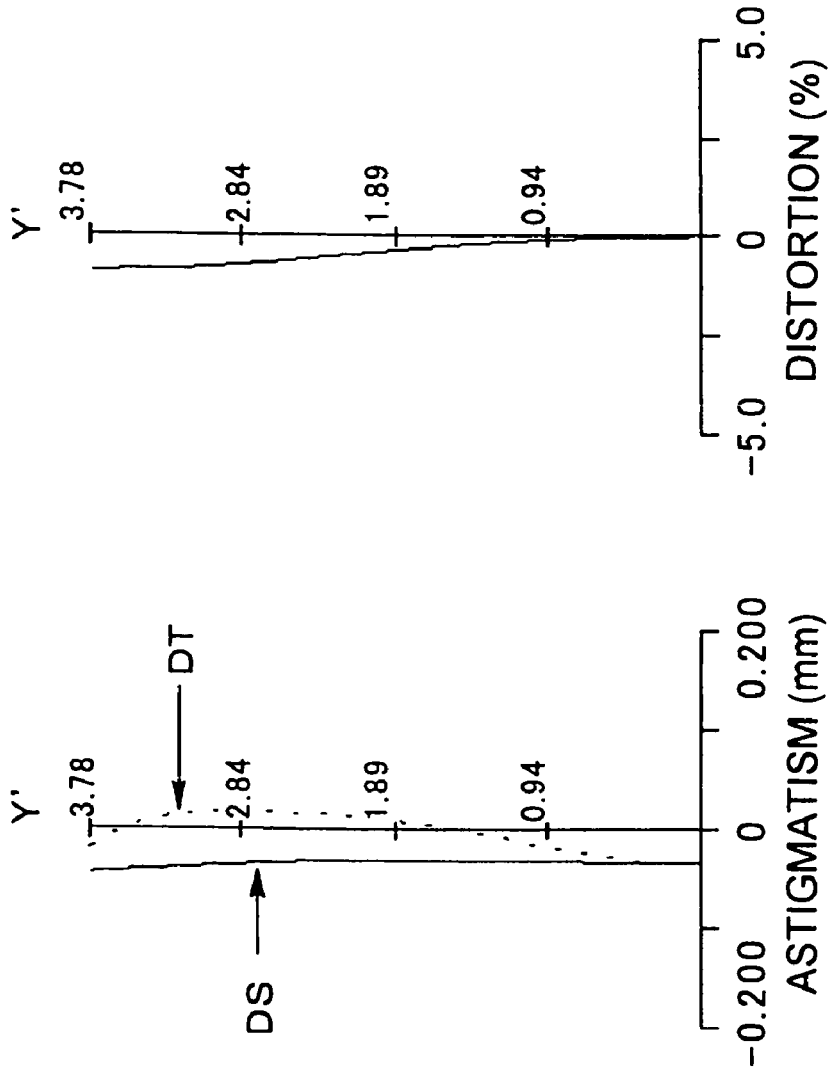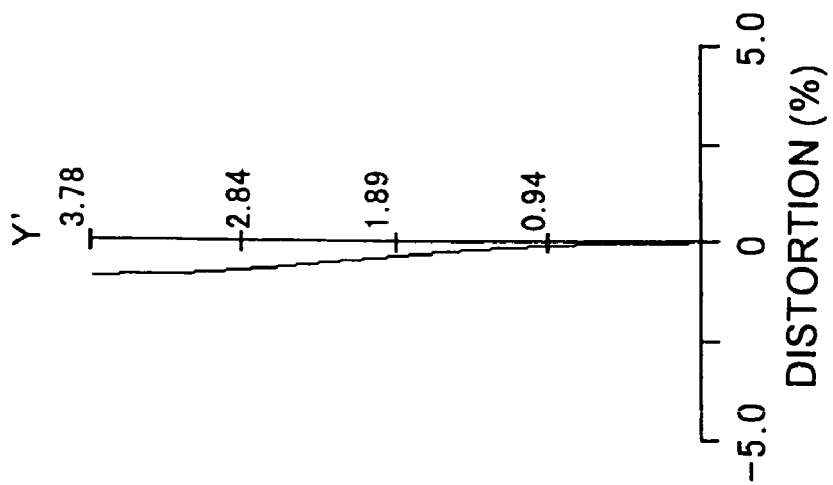

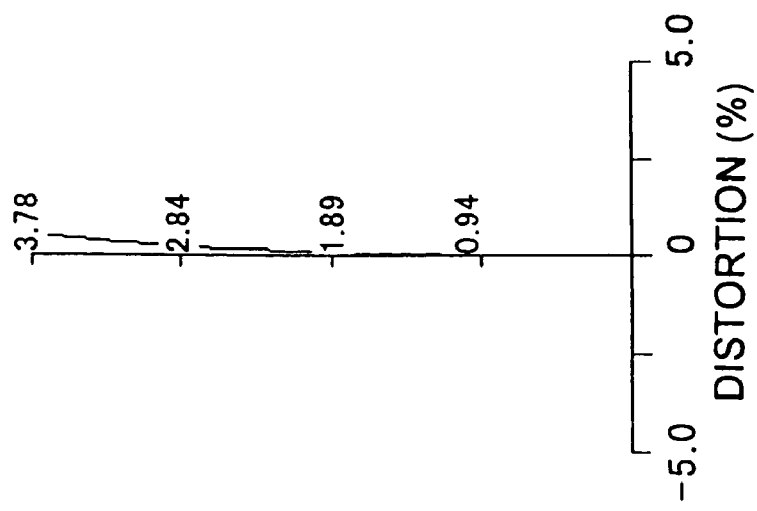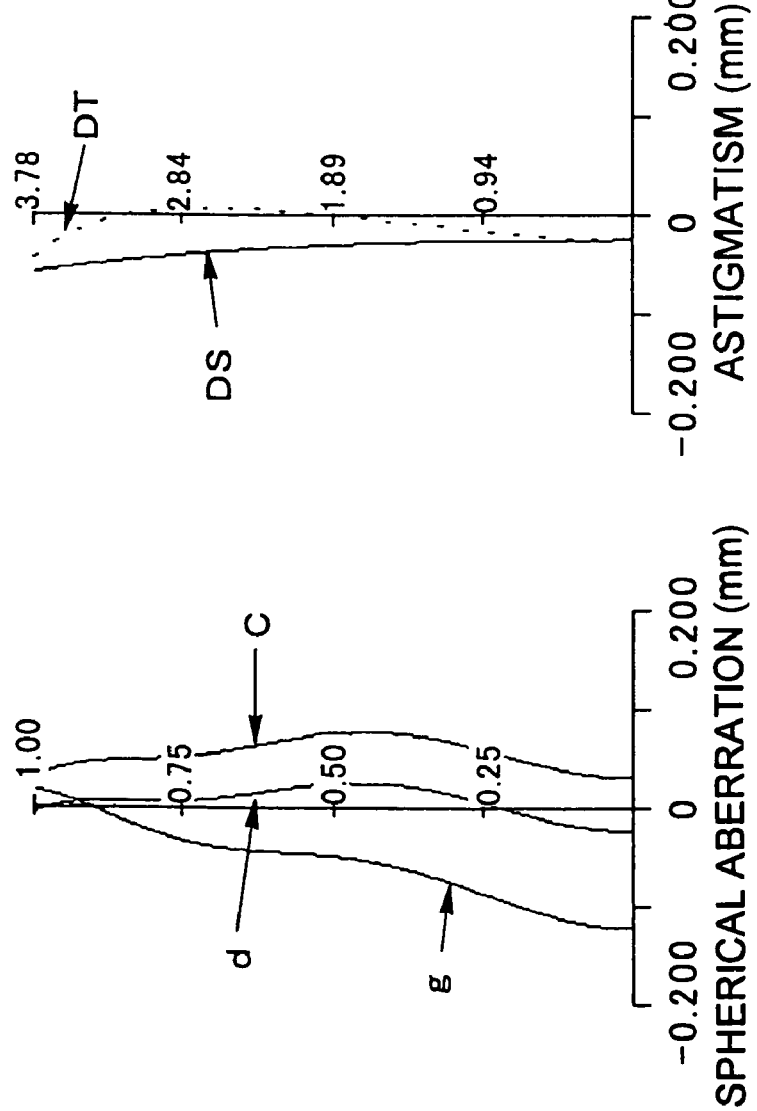

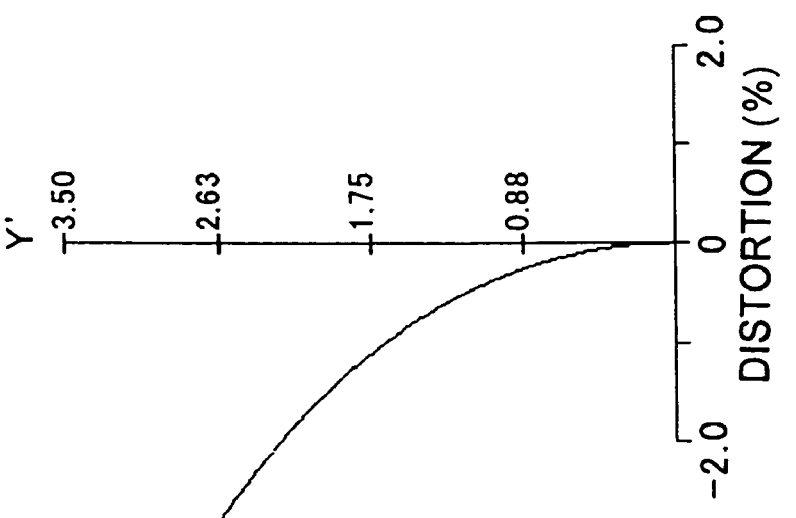
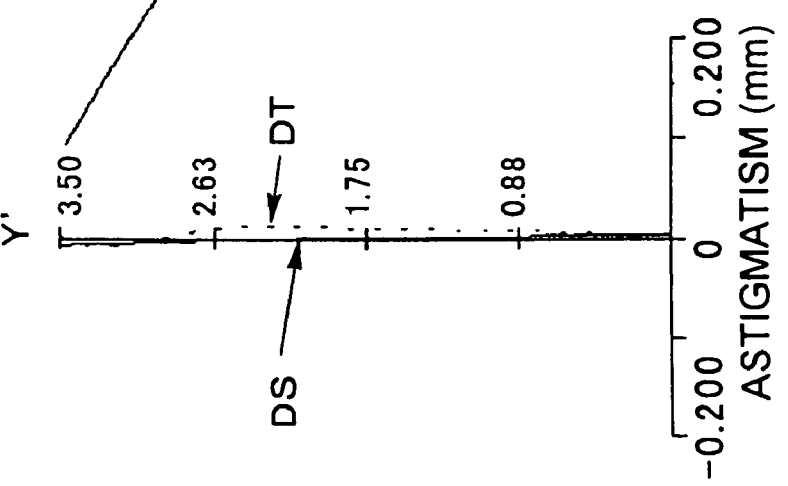
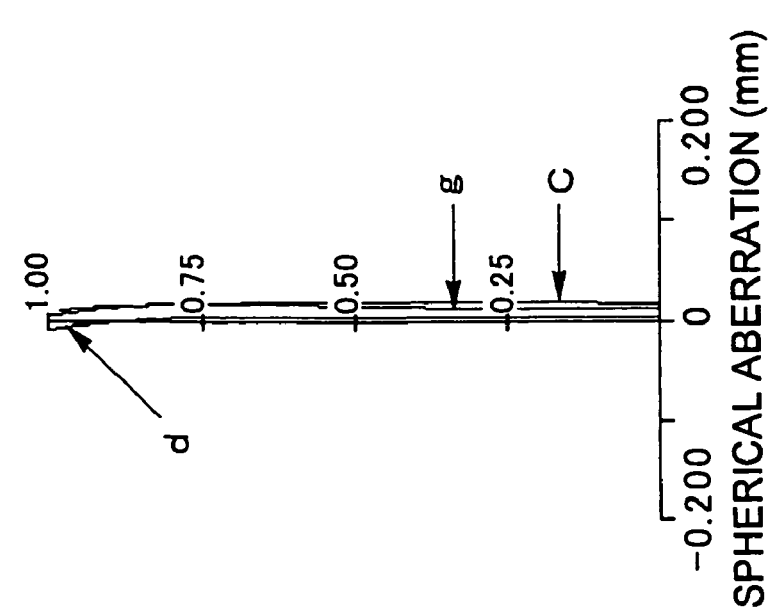

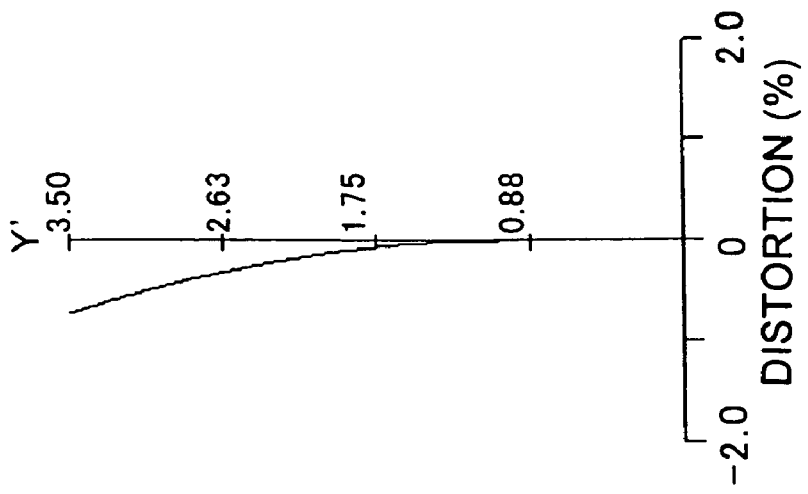
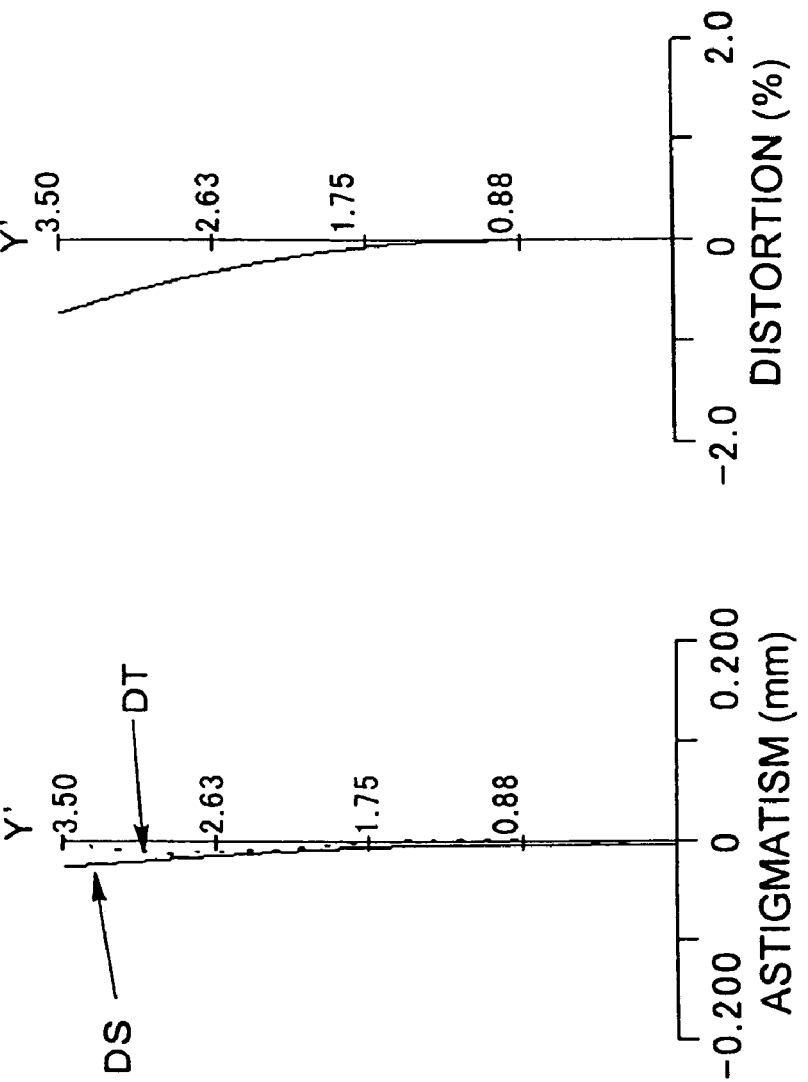
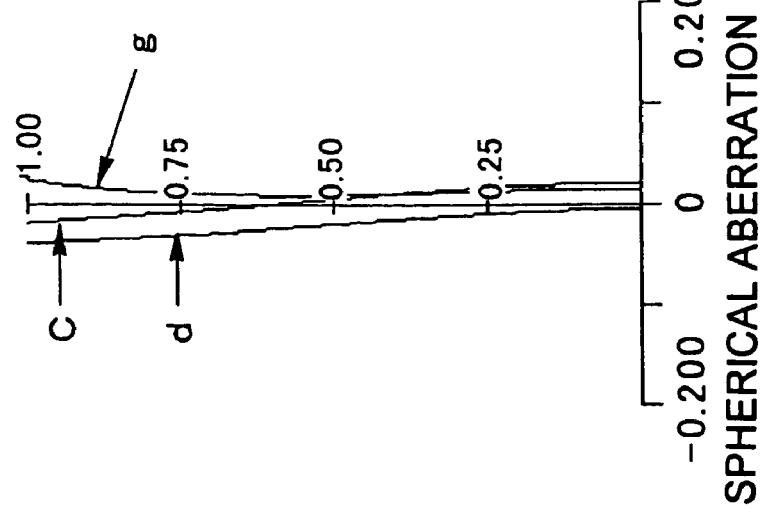

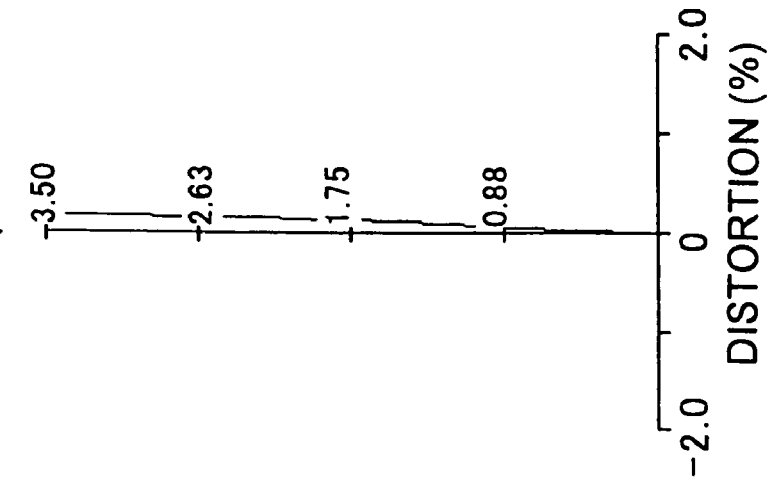
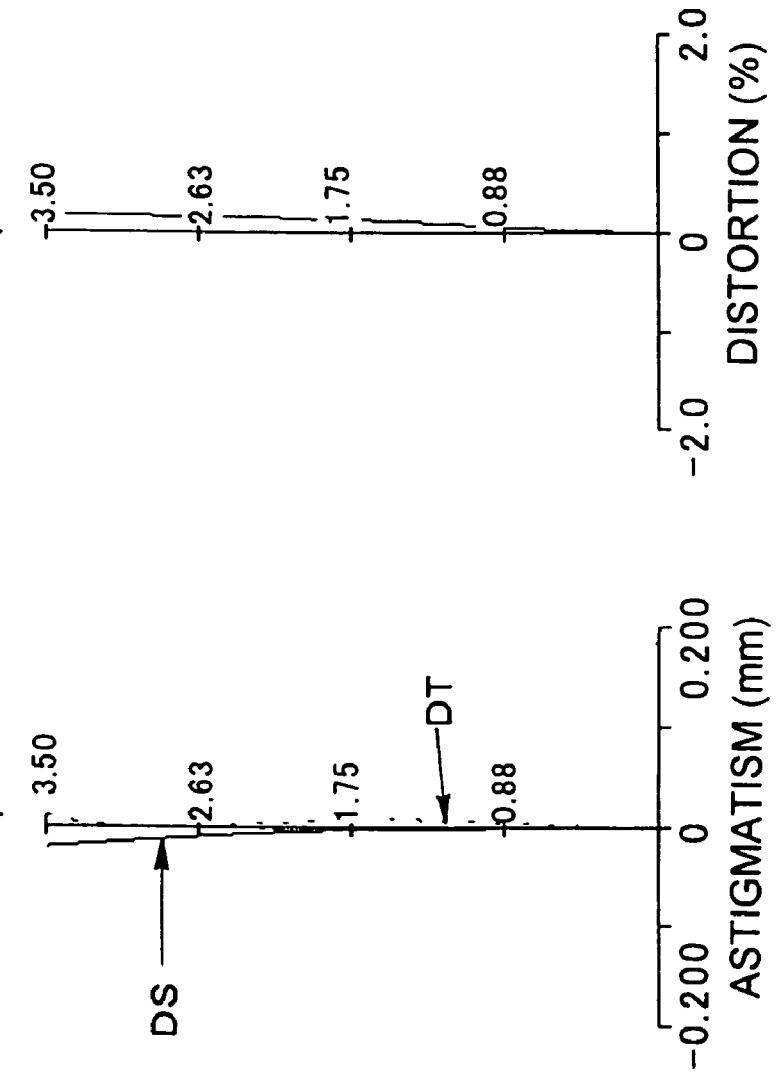
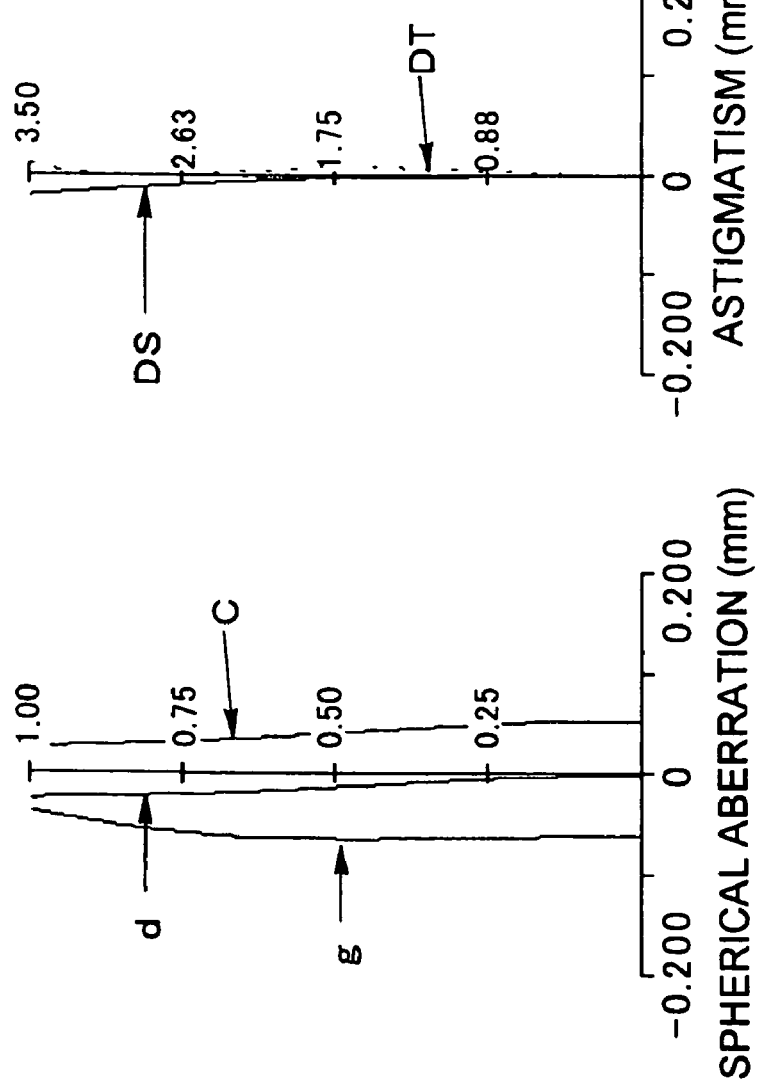

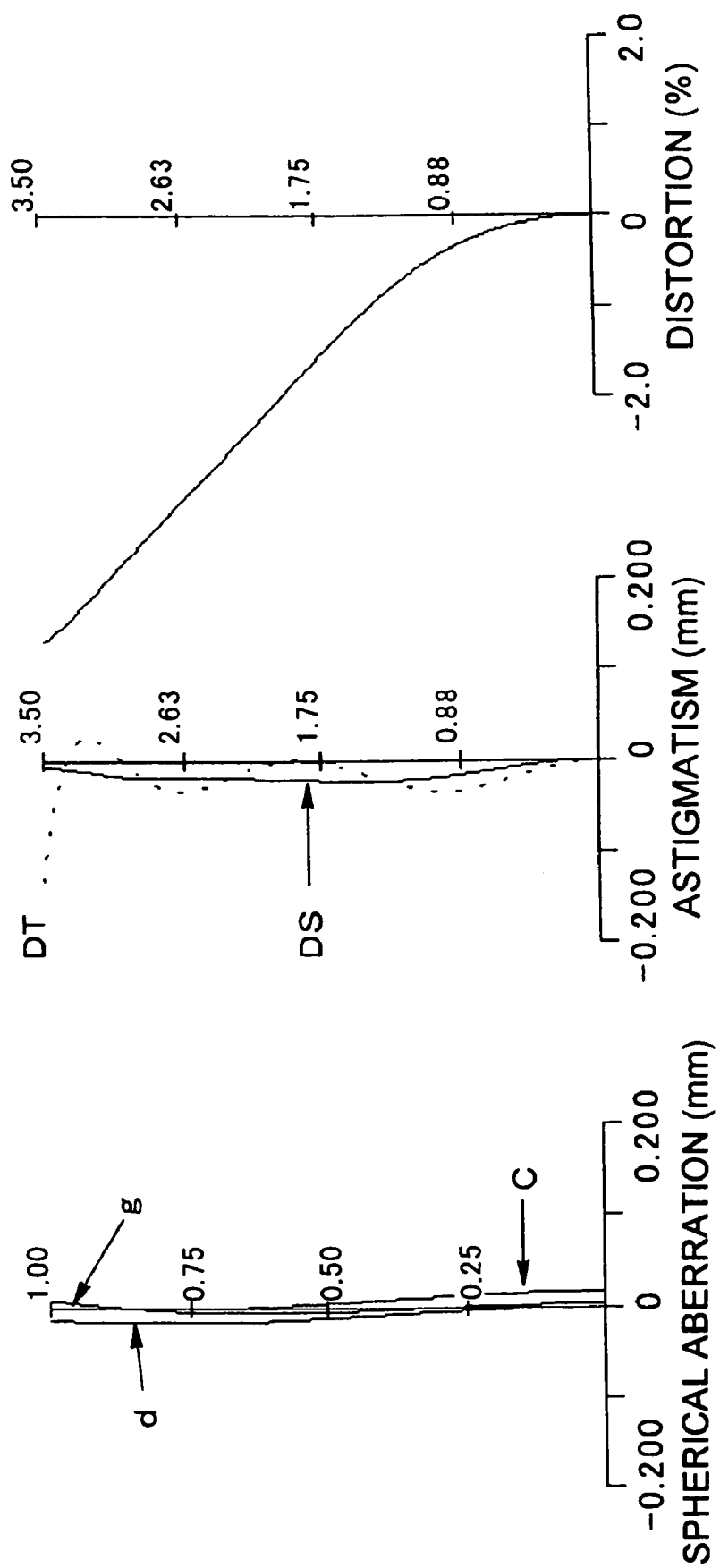

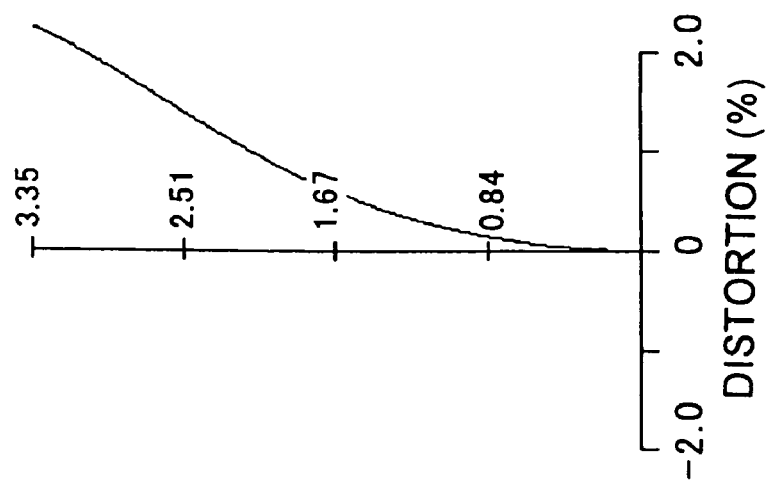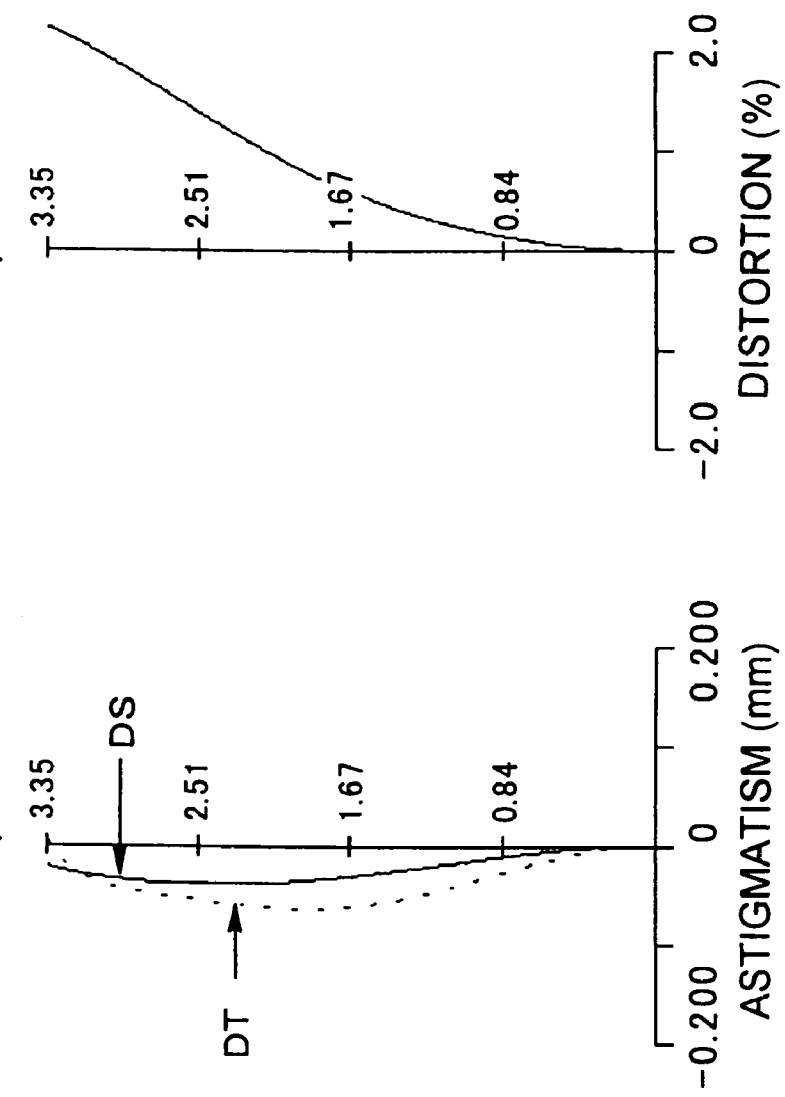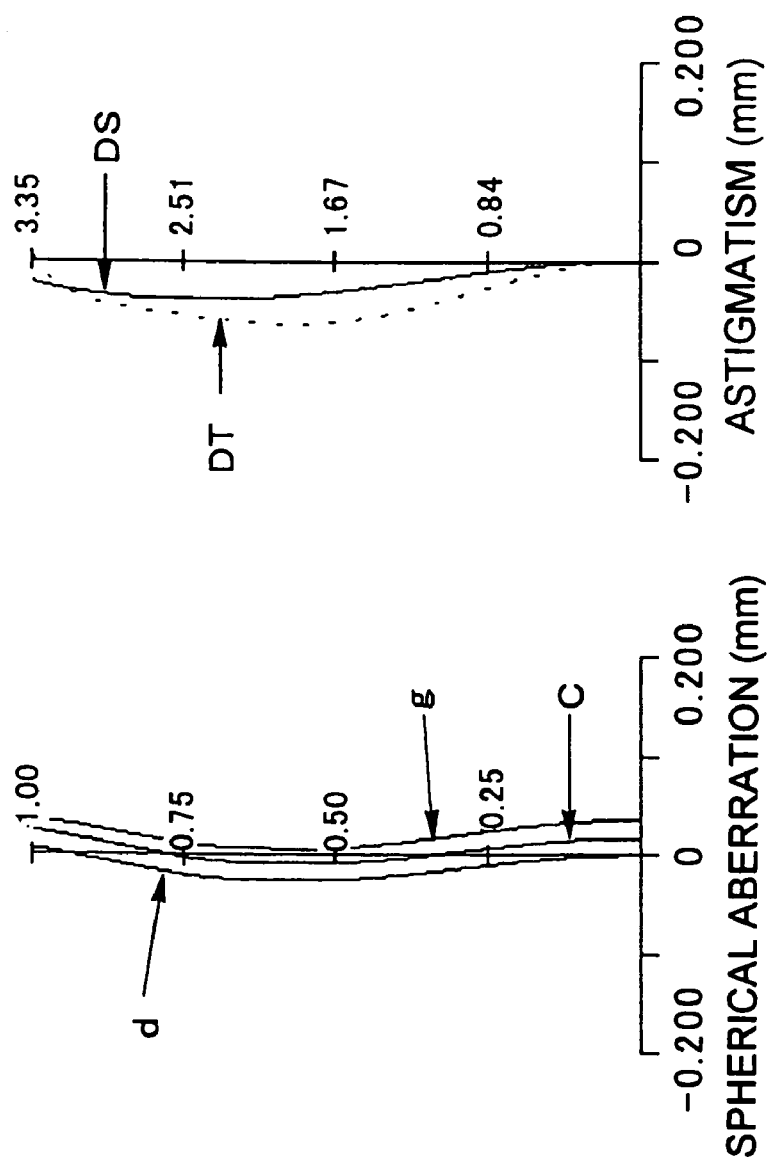

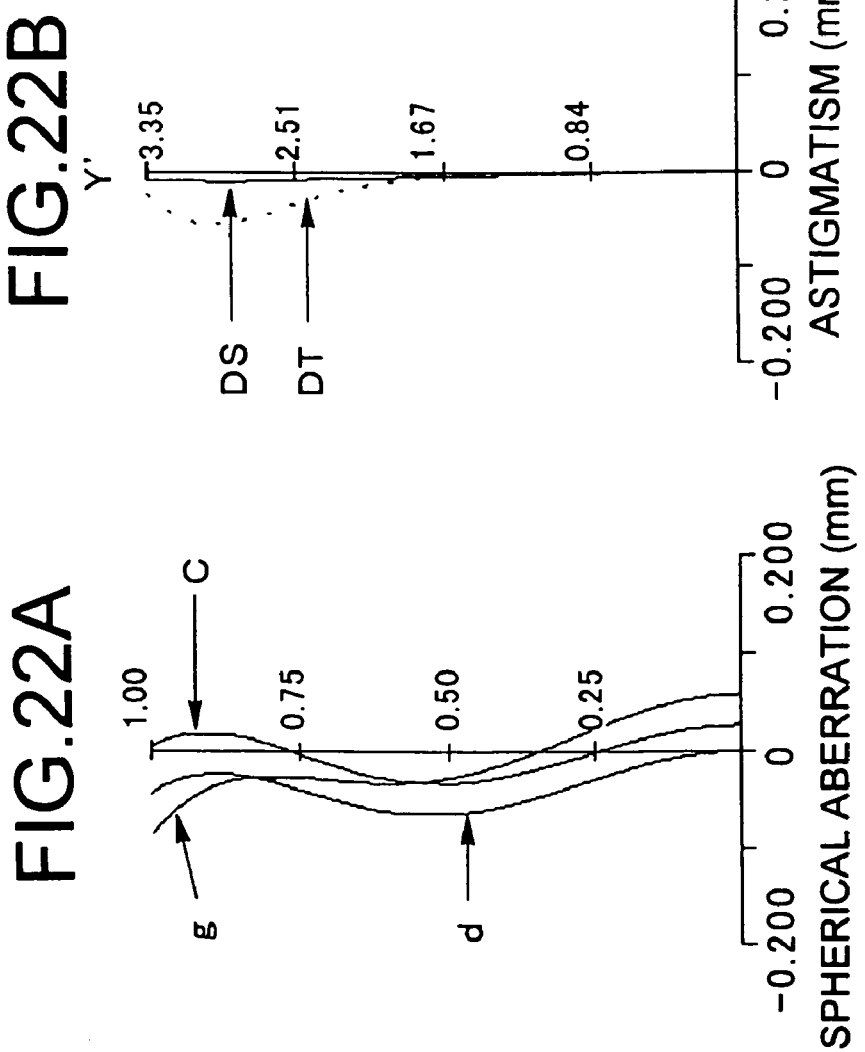

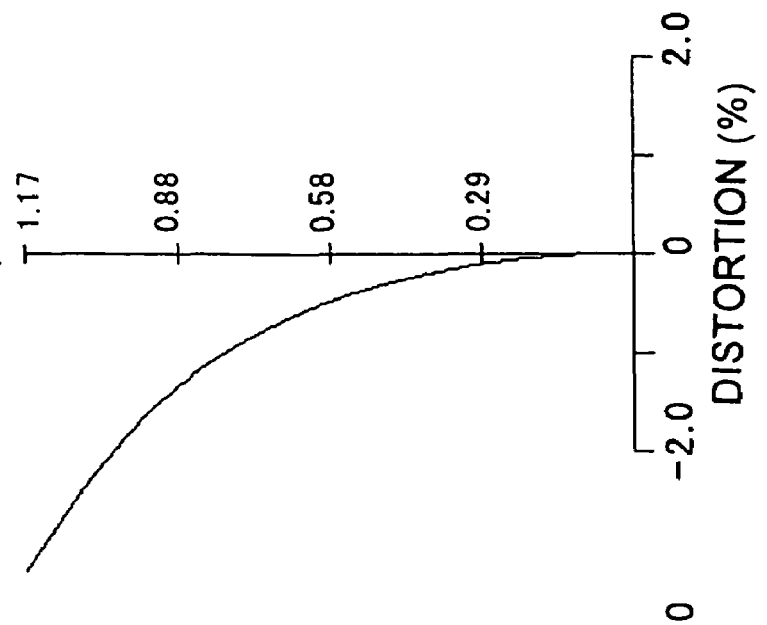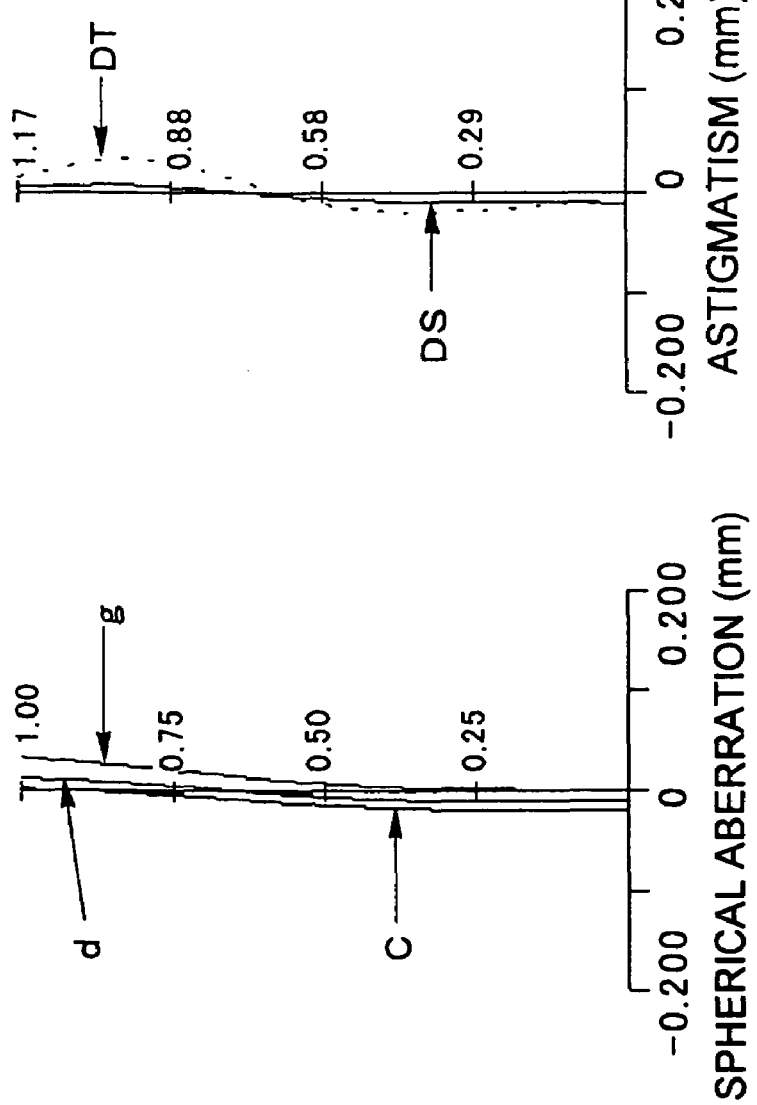

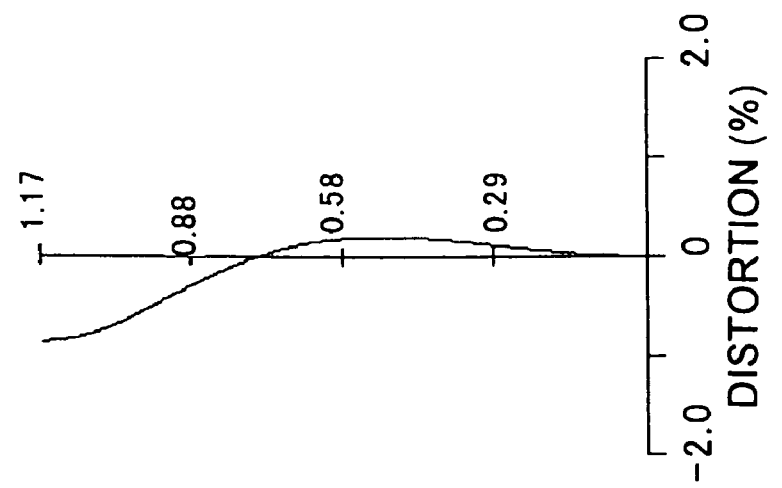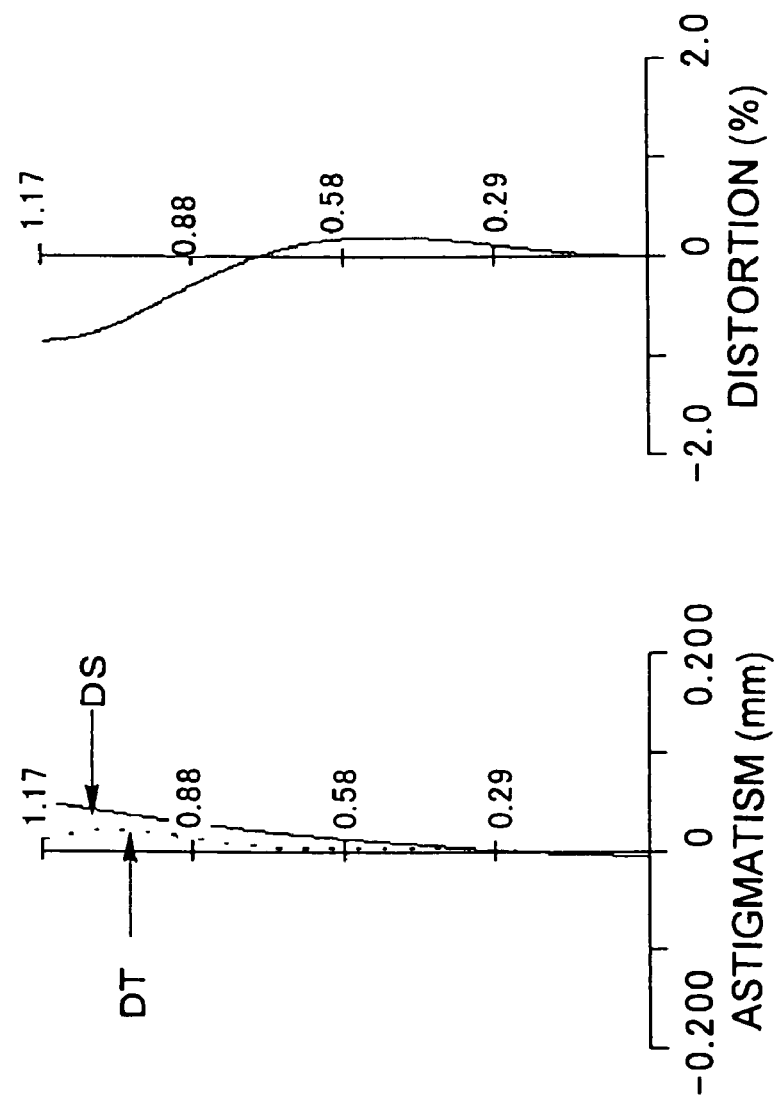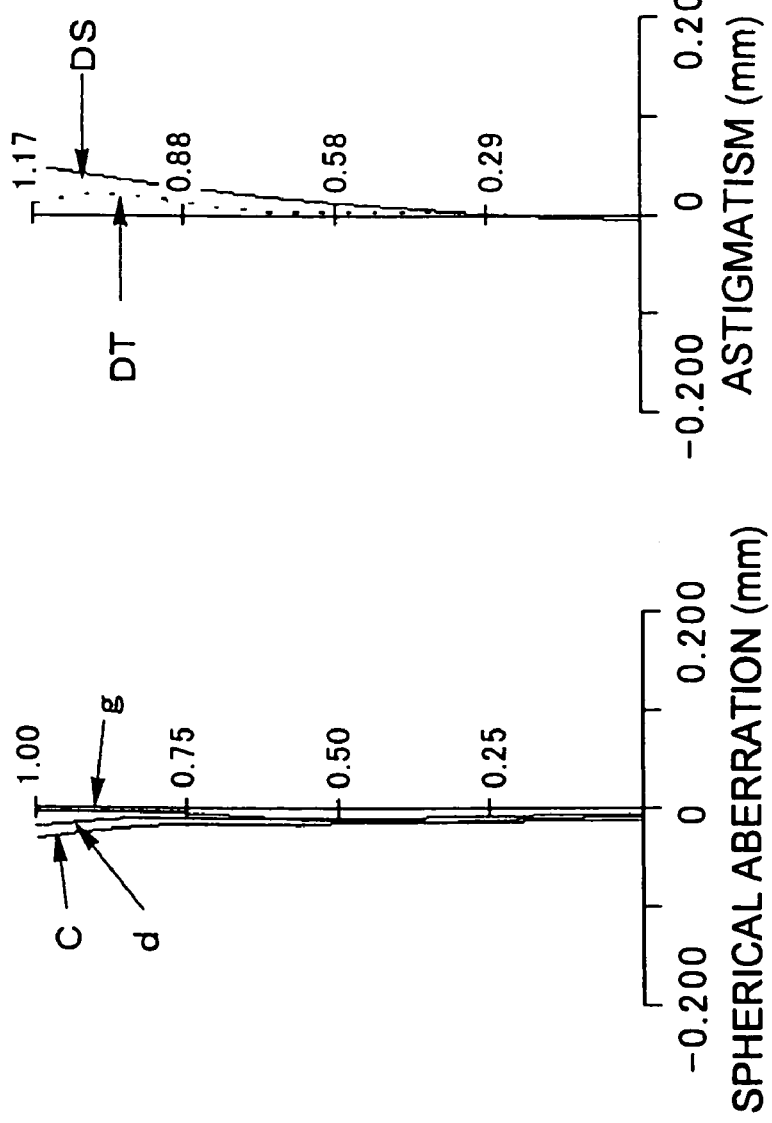

IMAGE-TAKING LENS APPARATUS

This application is based on Japanese Patent Application No. 2004-153091 filed on May 24, 2004, the contents of which are hereby incorporated by reference.

BACKGROUND OF THE INVENTION

1. Field of the Invention

The present invention relates to an image-taking lens apparatus, and more particularly to an image-taking lens apparatus (used as a main component of, for example, a digital still camera, digital video camera, or camera incorporated in or externally fitted to a personal computer, mobile computer, cellular phone, personal digital assistant, or the like) that optically takes in an image of a subject through an image-taking lens system and then outputs it as an electrical signal by means of an image sensor. The present invention relates, in particular, to an image-taking lens apparatus provided with a compact image-taking lens system, and to a slim camera provided with such an image-taking lens apparatus.

2. Description of Related Art

In recent years, as personal computers and the like become increasingly widespread, digital still cameras, digital video cameras, and the like (hereinafter referred to simply as "digital cameras"), which permit easy acquisition of image information into digital appliances, have been becoming more and more popular among individual users. Digital cameras are expected to become still more popular in future as image information inputting devices. In general, the image quality of such a digital camera is determined by the number of pixels provided in the solid-state image sensor, such as a CCD (charge-coupled device), incorporated therein. Nowadays, digital cameras designed for general consumers offer high resolutions over 500 million pixels, and are thus approaching silver-halide film cameras in image quality. Accordingly, in the image-taking lens systems used in digital cameras, high optical performance is sought to cope with the increasingly high resolutions of image sensors.

On the other hand, even in digital cameras designed for general consumers, zooming of an image, in particular optical zooming with little image degradation, is sought, and in addition, for higher portability, slimming-down is also sought. The biggest bottleneck in slimming down a camera is the thickness of the image-taking lens system from the surface closest to the object to the image surface. A well-known technique for reducing this thickness is the so-called collapsible construction in which the image-taking lens system is moved out of the camera body when photographing is performed and is collapsed into the camera body when the camera is carried around. However, with the collapsible construction, it is impossible to make the thickness of the image-taking lens apparatus smaller than the sum of the thickness of the lens system itself, the thickness of the image sensor, and the thickness of the optical filter components required by the image sensor. This makes it impossible to make digital cameras satisfactorily compact. Moreover, with the collapsible construction, the lens needs to be moved out when the camera is used, and this requires a complicated lens barrel construction. This results in high manufacturing difficulty, leading to great degradation in image quality and a great increase in costs. Furthermore, in a construction where the lens is moved out after the camera power is turned on, it takes time to complete the preparations for photographing. This makes the user more likely to miss good opportunities for photographing.

To solve the problems mentioned above, zoom lens systems that attempt to slim down a camera as a whole by bending the optical path by using a prism provided in the middle of the optical system are proposed in the following patent publications:

Publication 1: Japanese Patent Application Laid-Open No. 2000-131610

Publication 2: Japanese Patent Application Laid-Open No. 2003-43354

Publication 3: Japanese Patent Application Laid-Open No. 2003-107356

Publication 4: Japanese Patent Application Laid-Open No. 2003-98430

In the zoom lens systems disclosed in Publication 1, a prism having a refractive index of 1.569 or less is used. That is, the prism has too low a refractive index, making the total length of the zoom lens systems unduly long. Moreover, here, the technique of bending the optical axis is not used to effectively achieve slimming-down. Thus, the obtained image-taking lens systems cannot be said to be satisfactorily compact.

The zoom lens systems disclosed in Publications 2 to 4 adopt zoom constructions of the type (the so-called negative-led type) in which the first lens unit has a negative optical power. Most of these zoom lens systems include a plastic prism of which both the entrance-side and exit-side surfaces are given curvatures, and thus many of them are supposed to be difficult to manufacture. The zoom lens systems disclosed in Publication 3 include a glass prism of which both the entrance-side and exit-side surfaces are given curvatures, and such a glass prism is more difficult to manufacture than a plastic equivalent. When consideration is given to the technology of glass molding and of plastic injection molding and to the after-molding machining of a prism, giving curvatures to a prism involves many problems to be solved in terms of the manufacture of the prism. For example, manufacturing errors arising in integral molding may result in degraded performance, and the manufacturing difficulty of integral molding itself may result in higher costs. Moreover, the prisms used have refractive indices of 1.883 or less. Thus, the obtained image-taking lens systems cannot be said to be satisfactorily compact.

SUMMARY OF THE INVENTION

In view of the conventionally experienced problems mentioned above, it is an object of the present invention to provide a slim image-taking lens apparatus provided with a compact, high-performance zoom lens system so as to offer high image quality.

To achieve the above object, in one aspect of the present invention, an image-taking lens apparatus is provided with: an image sensor for converting an optical image of a subject into an electrical signal; and an image-taking lens system for forming the optical image on the image sensor. Here, the image-taking lens system includes a prism for bending the optical path, and the prism fulfills the following conditional formula:

$$Ndp > 1.9$$

where $Ndp$ represents a refractive index for a d-line of the prism.

In another aspect of the present invention, a zoom lens system that includes a plurality of lens units and that achieves zooming by varying the distances between the lens units is provided with: a prism for bending the optical path. Here, the prism fulfills the conditional formula noted above.

In still another aspect of the present invention, a digital camera is provided with: an image sensor for converting an optical image of a subject into an electrical signal; and an image-taking lens system for forming the optical image on the image sensor. Here, the image-taking lens system includes a prism for bending the optical path, and the prism fulfills the conditional formula noted above.

According to the present invention, since the prism is so designed as to fulfill conditional formula (1), it is possible to realize an image-taking lens apparatus incorporating an image-taking lens system that offers high optical performance despite being compact. The higher the refractive index of the prism, the shorter the physical axial distance that the object light travels when passing through the prism. Thus, by using a prism that fulfills conditional formula (1), it is possible to reduce both the total length of the image-taking lens system and the dimension thereof along the thickness direction thereof, and thus it is possible to realize an optically equivalent construction in a more compact space. Moreover, since the total length of the zoom lens system can be reduced without giving a curvature to the entrance-side or exit-side surface of the prism, it is easy to manufacture the prism, leading to lower costs. By using image-taking lens apparatuses according to the present invention in devices such as digital cameras and portable data devices, it is possible to contribute to making such devices slim, lightweight, compact, inexpensive, high-performance, intelligent, and otherwise better.

BRIEF DESCRIPTION OF THE DRAWINGS

FIGS. 11A to 11C are aberration diagrams of Example 1, at the wide-angle end;

FIGS. 12A to 12C are aberration diagrams of Example 1, at the middle focal length;

FIGS. 13A to 13C are aberration diagrams of Example 1, at the telephoto end;

FIGS. 14A to 14C are aberration diagrams of Example 2, at the wide-angle end;

FIGS. 15A to 15C are aberration diagrams of Example 2, at the middle focal length;

FIGS. 16A to 16C are aberration diagrams of Example 2, at the telephoto end;

FIGS. 17A to 17C are aberration diagrams of Example 3, at the wide-angle end;

FIGS. 18A to 18C are aberration diagrams of Example 3, at the middle focal length;

FIGS. 19A to 19C are aberration diagrams of Example 3, at the telephoto end;

FIGS. 20A to 20C are aberration diagrams of Example 4, at the wide-angle end;

FIGS. 21A to 21C are aberration diagrams of Example 4, at the middle focal length;

FIGS. 22A to 22C are aberration diagrams of Example 4, at the telephoto end;

FIGS. 23A to 23C are aberration diagrams of Example 5, at the wide-angle end;

FIGS. 24A to 24C are aberration diagrams of Example 5, at the middle focal length;

DETAILED DESCRIPTION OF PREFERRED EMBODIMENTS

Hereinafter, image-taking lens apparatuses and the like embodying the present invention will be described with reference to the drawings. An image-taking lens apparatus according to the invention is an optical apparatus that optically takes in an image of a subject and then outputs it in the form of an electrical signal. Such an image-taking lens apparatus is used as a main component of a camera that is used to photograph a still or moving picture of a subject. Examples of such cameras include digital cameras, video cameras, surveillance cameras, car-mounted cameras, cameras for videophones, cameras for intercoms, and cameras incorporated in or externally fitted to personal computers, mobile computers, cellular phones, personal digital assistants (PDAs), peripheral devices therefor (such as mouses, scanners, and printers), and other digital appliances. As these examples show, by the use of an image-taking lens apparatus, it is possible not only to build a camera but also to incorporate an image-taking lens apparatus in various devices to provide them with a camera capability. For example, it is possible to realize a digital appliance provided with an image input capability, such as a cellular phone furnished with a camera.

Incidentally, the term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking lens apparatus provided with an image-taking lens system for forming an optical image, an image sensor for converting the optical image into an electrical signal, and other components, examples of such cameras including digital still cameras, digital movie cameras, and Web cameras (i.e., cameras that are connected, either publicly or privately, to a device connected to a network to permit exchange of images, including both those connected directly to a network and those connected to a network by way of a device, such as a personal computer, having an information processing capability).

Figure 1:
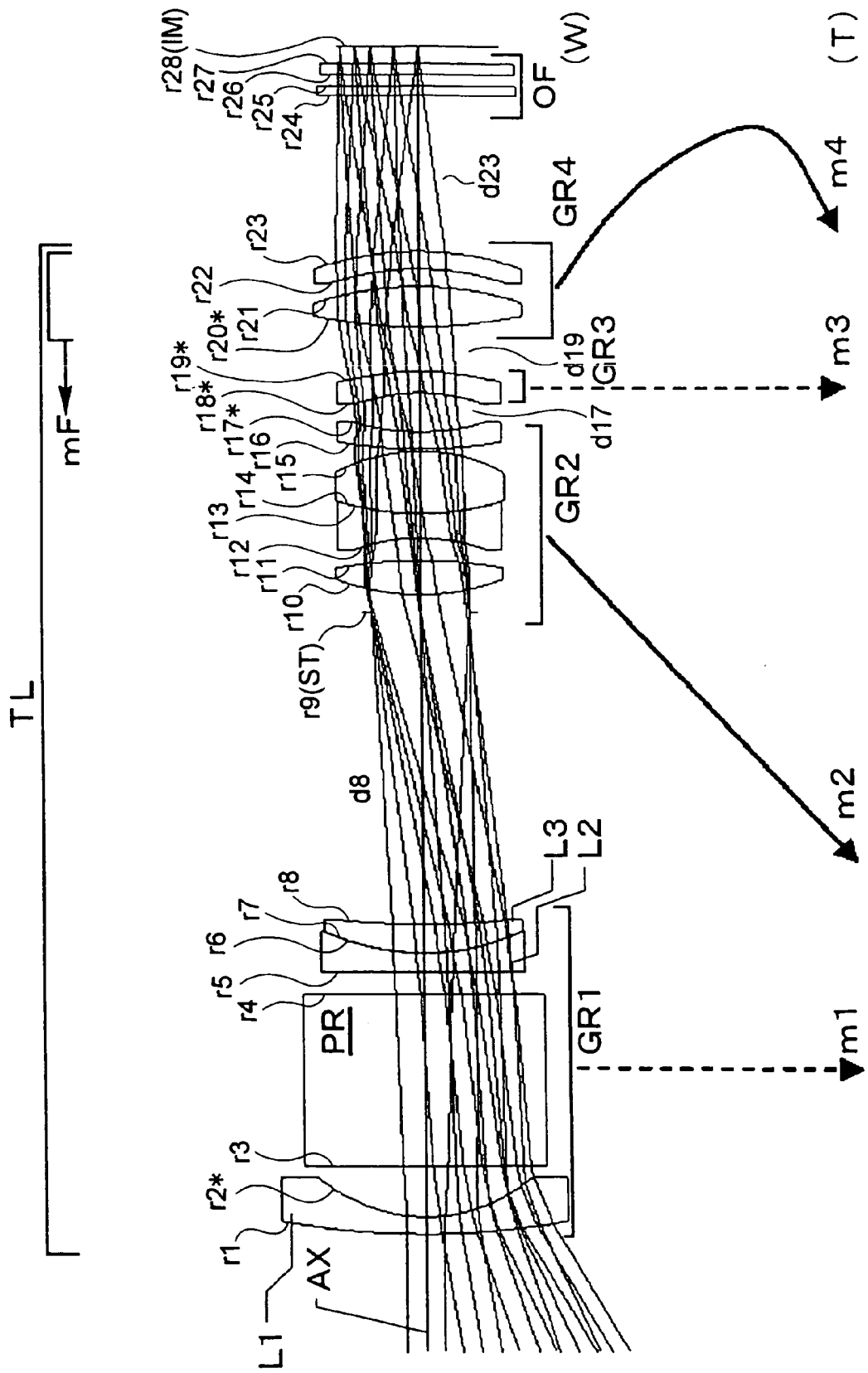
FIG. 1 is an optical construction diagram showing the optical path and the lens arrangement of the first embodiment (Example 1), with the optical path straightened.
Figure 2:
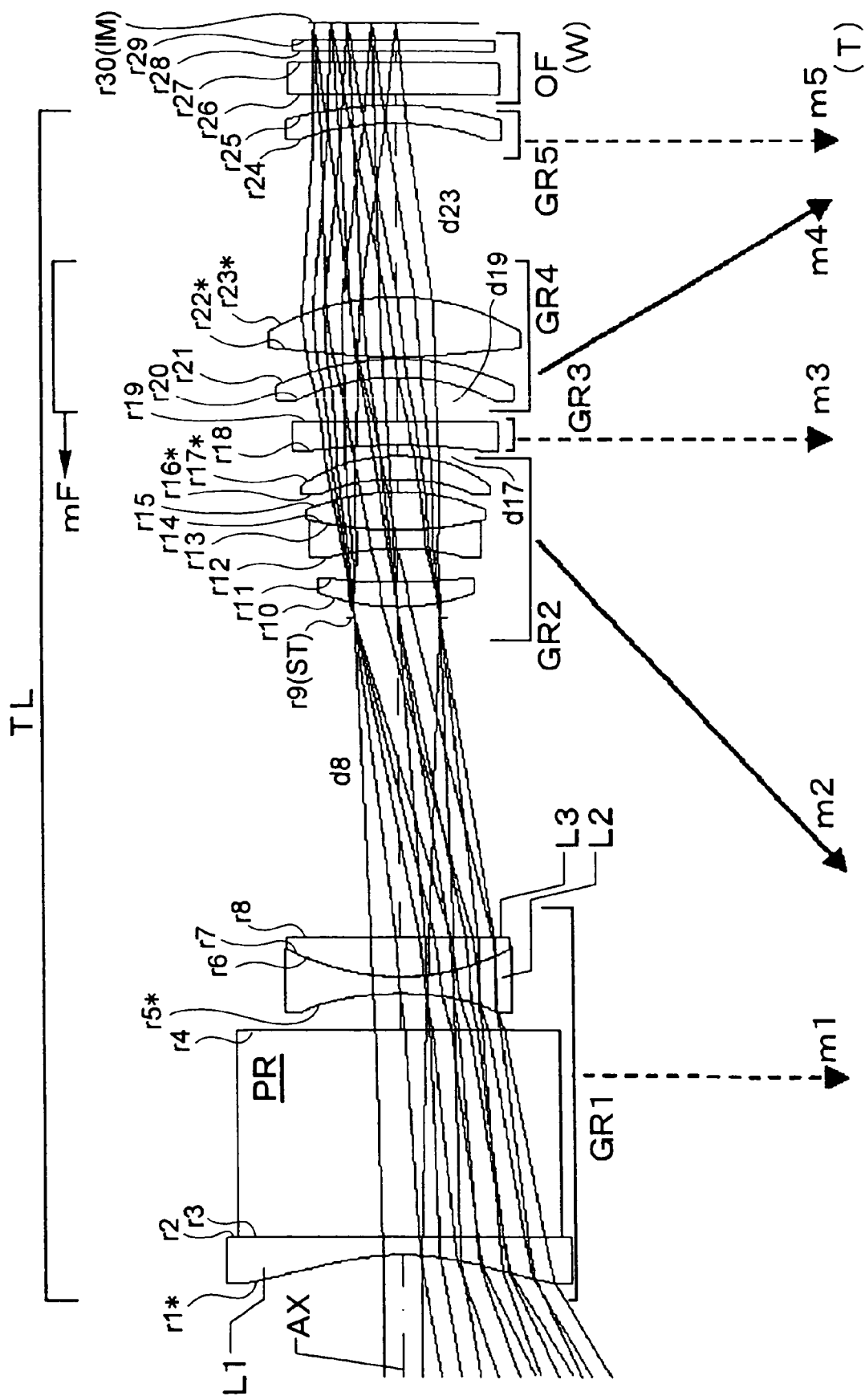
FIG. 2 is an optical construction diagram showing the optical path and the lens arrangement of the second embodiment (Example 2), with the optical path straightened.
Figure 3:
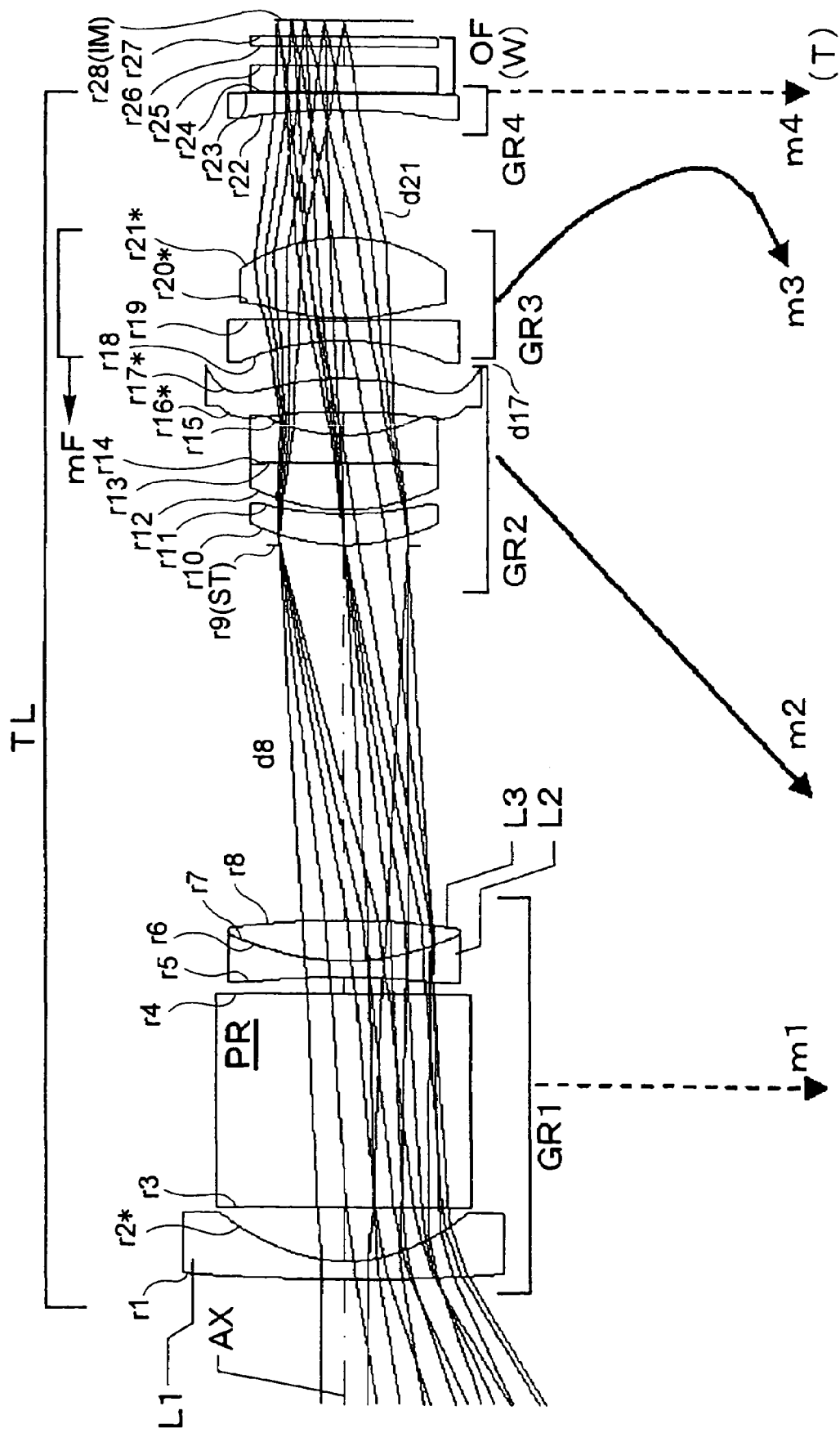
FIG. 3 is an optical construction diagram showing the optical path and the lens arrangement of the third embodiment (Example 3), with the optical path straightened.
Figure 4:
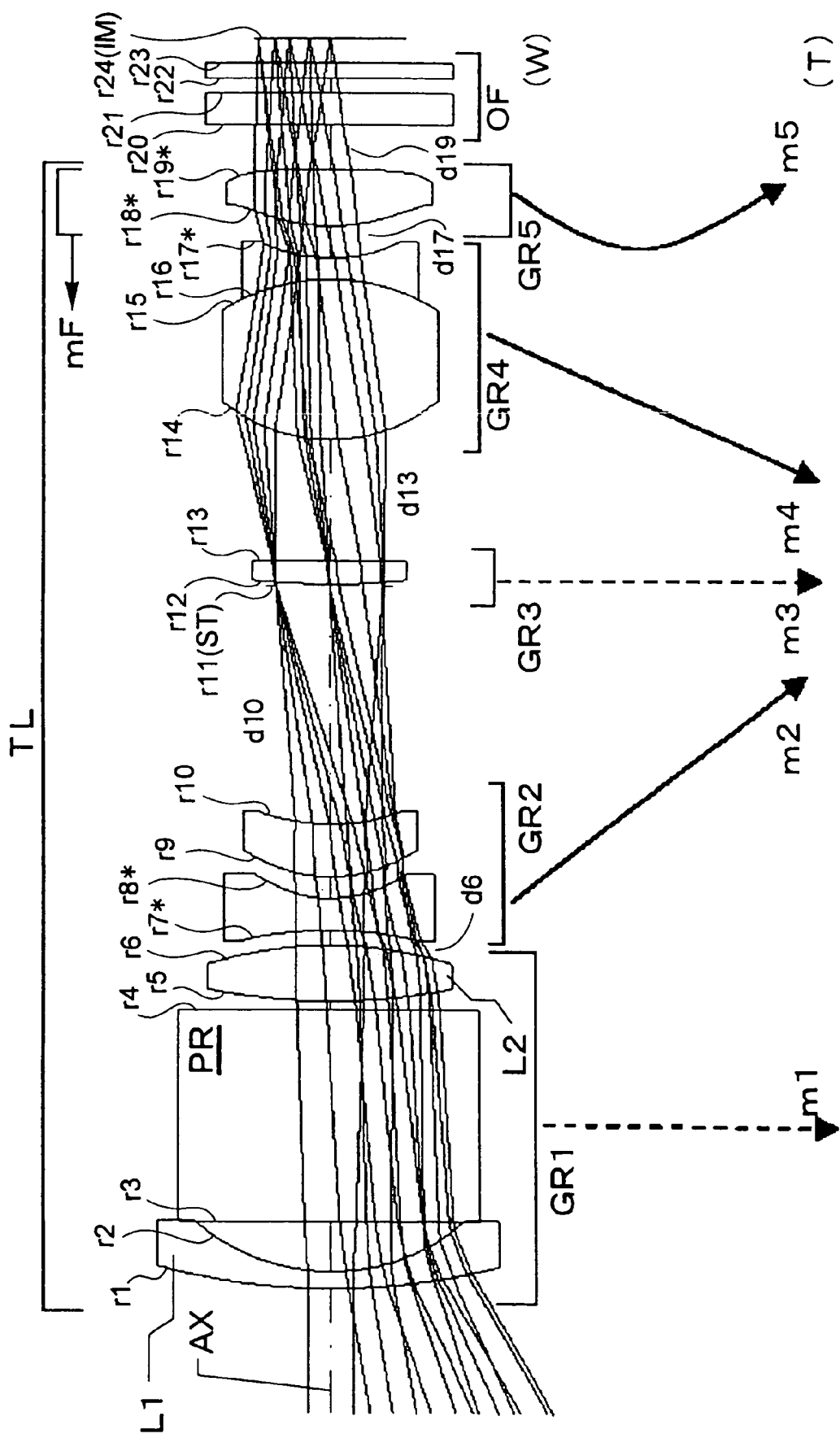
FIG. 4 is an optical construction diagram showing the optical path and the lens arrangement of the fourth embodiment (Example 4), with the optical path straightened.
Figure 5:
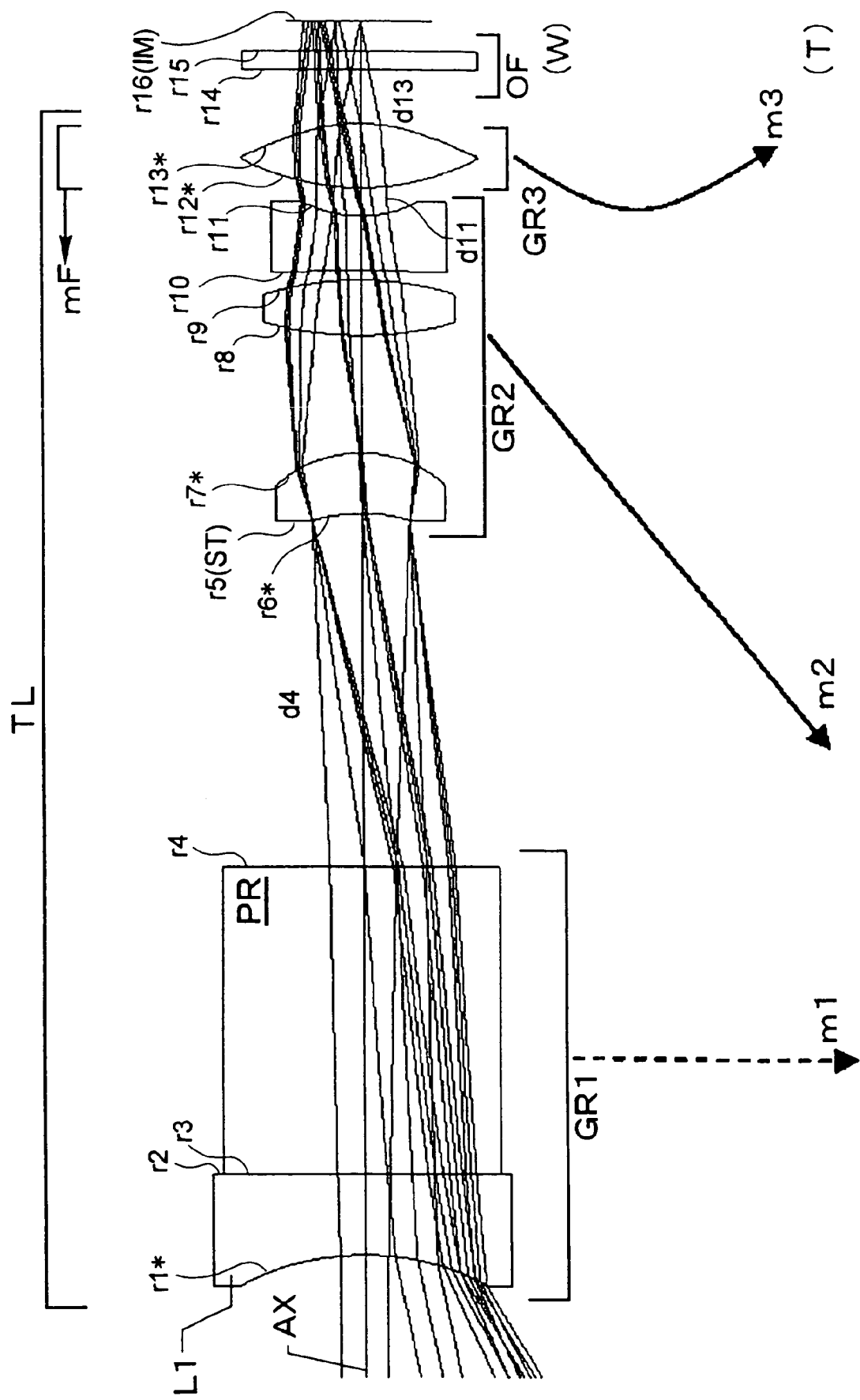
FIG. 5 is an optical construction diagram showing the optical path and the lens arrangement of the fifth embodiment (Example 5), with the optical path straightened.
Figure 6:
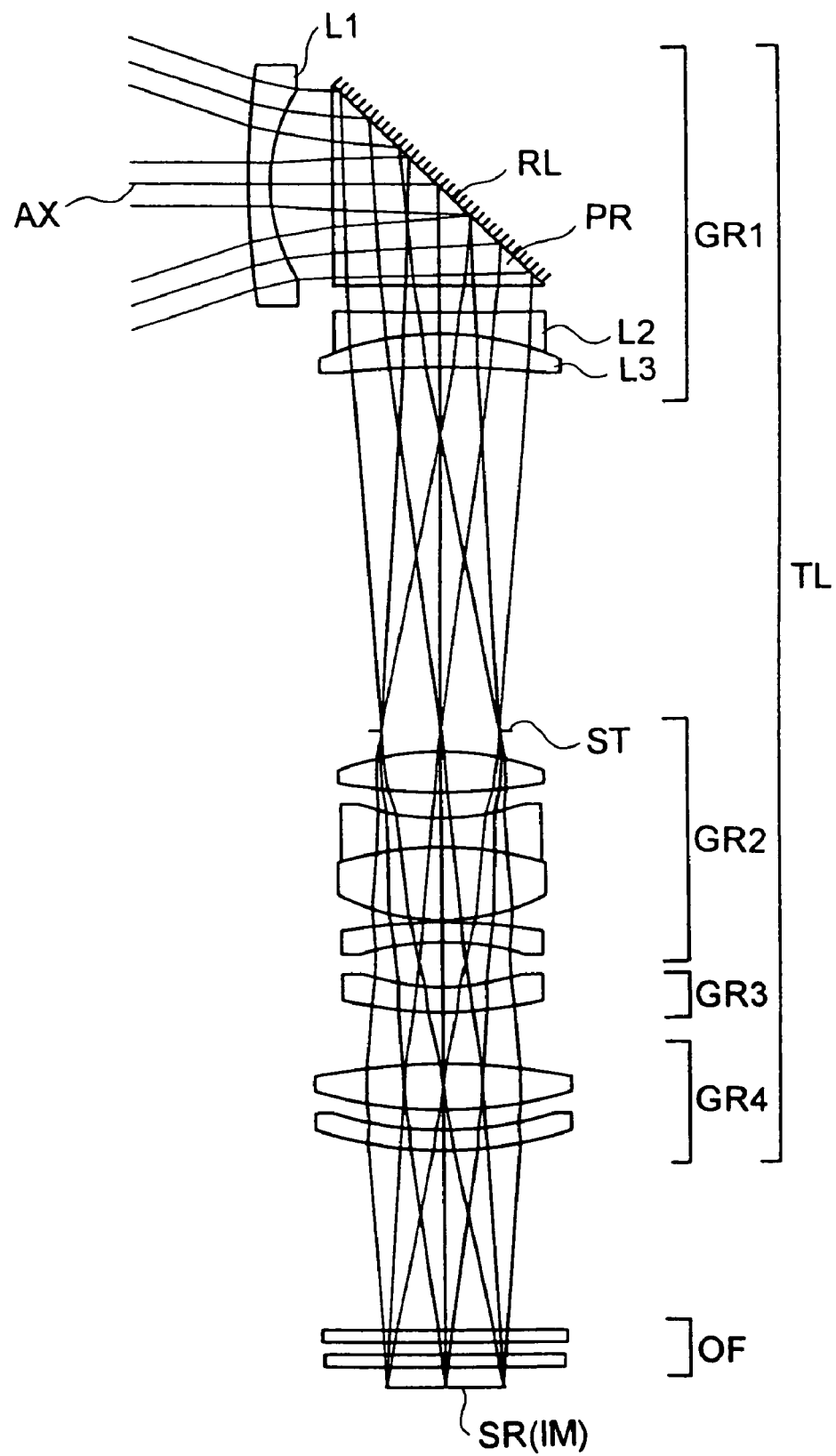
FIG. 6 is an optical construction diagram showing the optical path and the lens arrangement of the first embodiment (Example 1), with the optical path bent.
Figure 7:
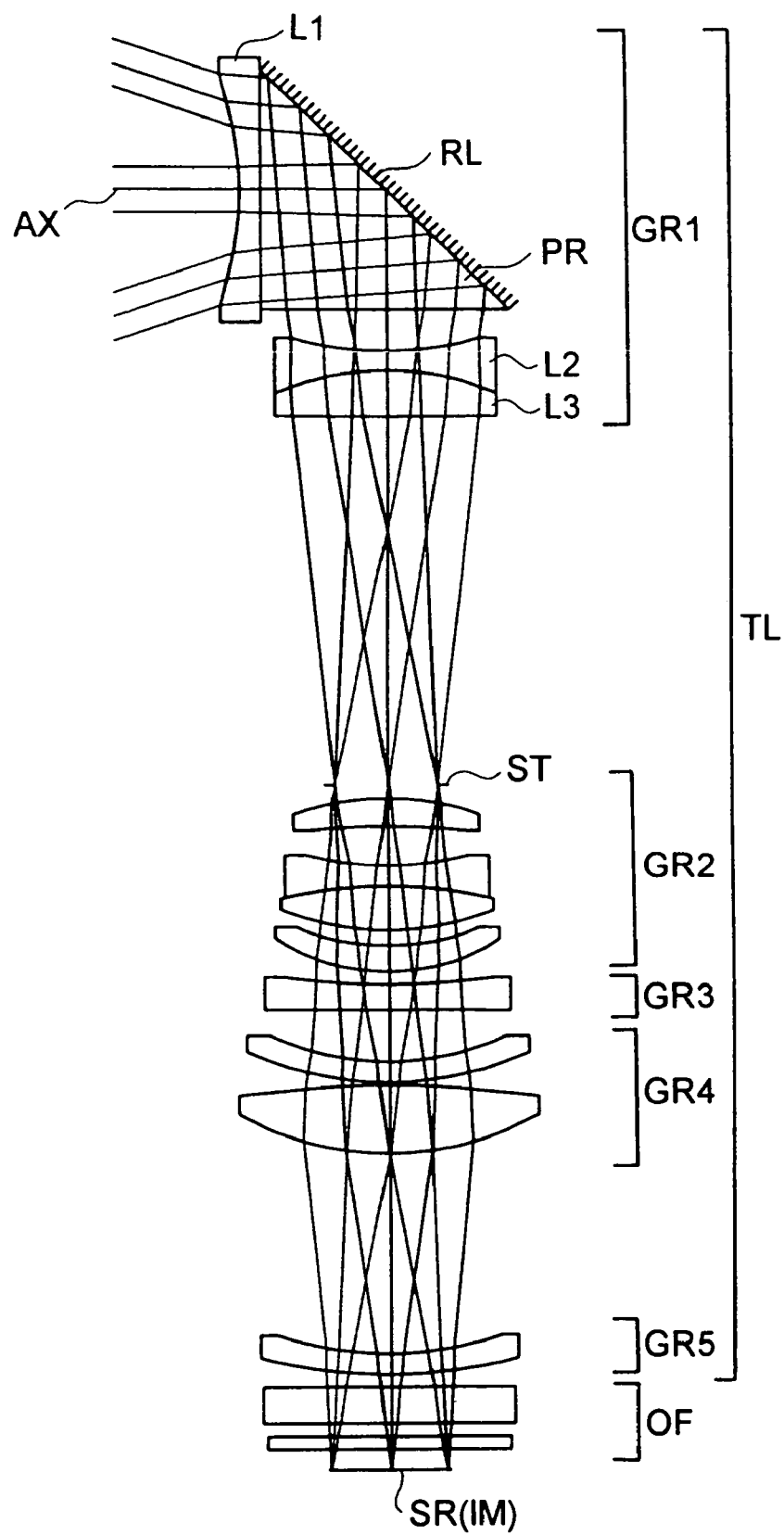
FIG. 7 is an optical construction diagram showing the optical path and the lens arrangement of the second embodiment (Example 2), with the optical path bent.
Figure 8:
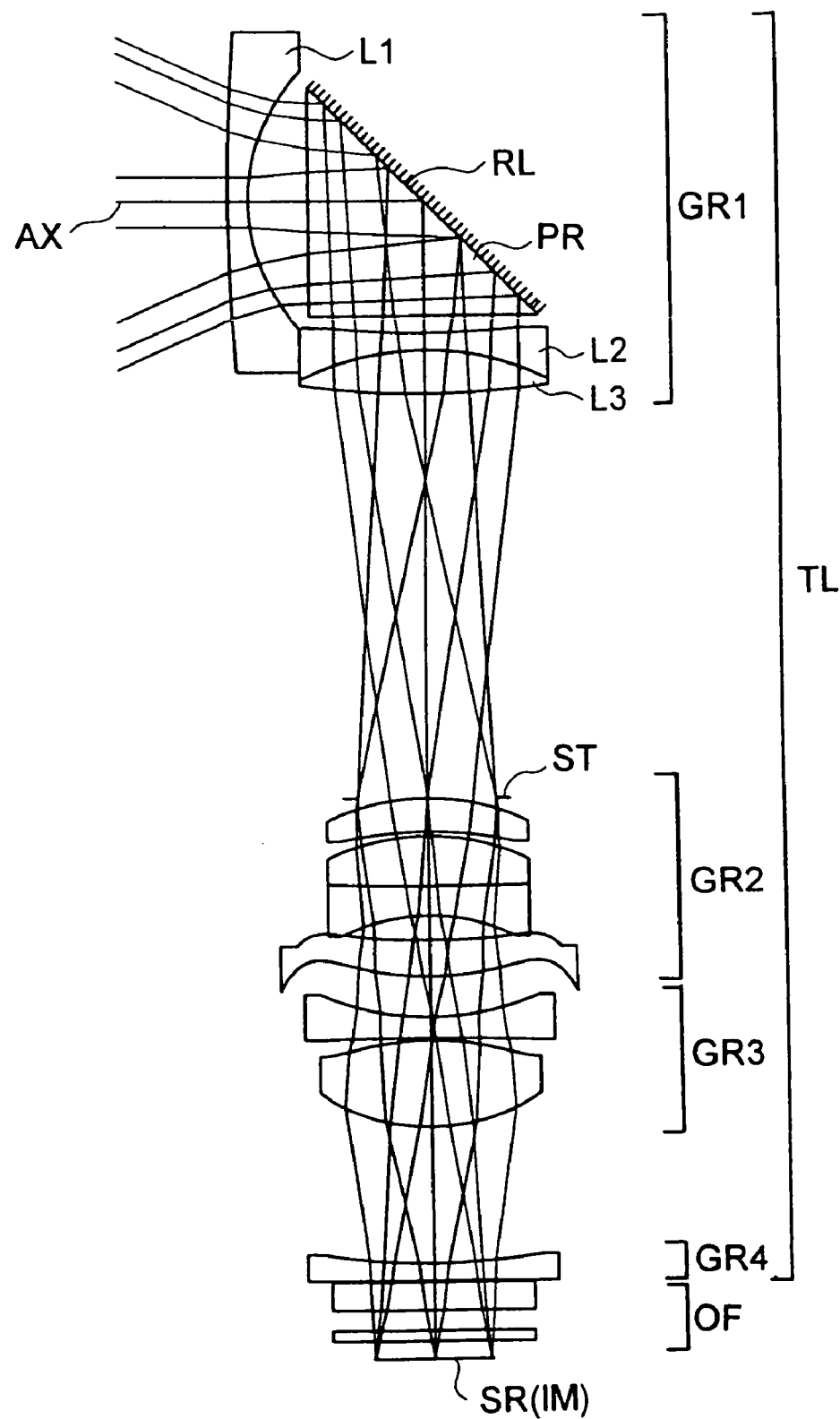
FIG. 8 is an optical construction diagram showing the optical path and the lens arrangement of the third embodiment (Example 3), with the optical path bent.
Figure 9:
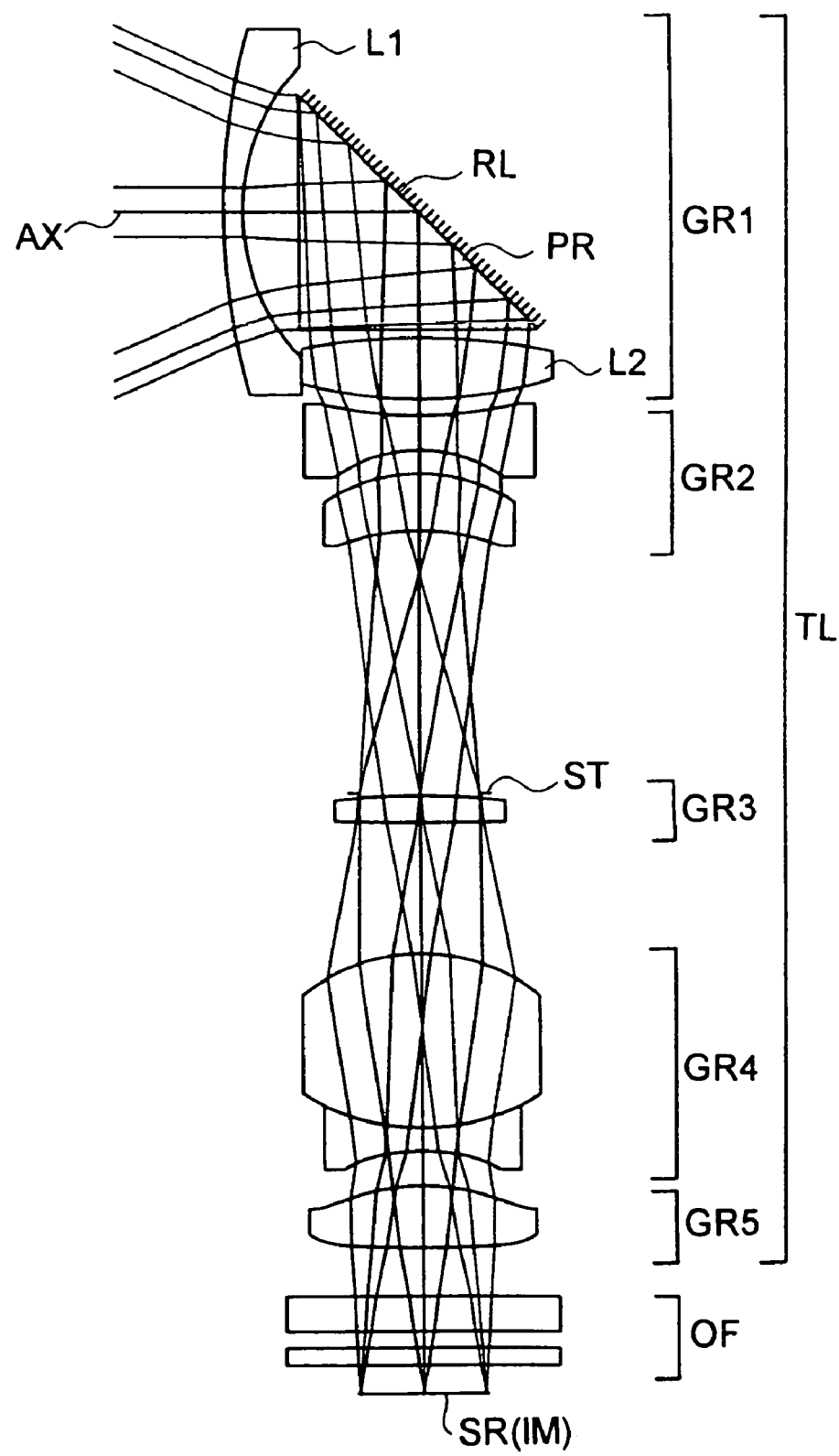
FIG. 9 is an optical construction diagram showing the optical path and the lens arrangement of the fourth embodiment (Example 4), with the optical path bent.
Figure 10:
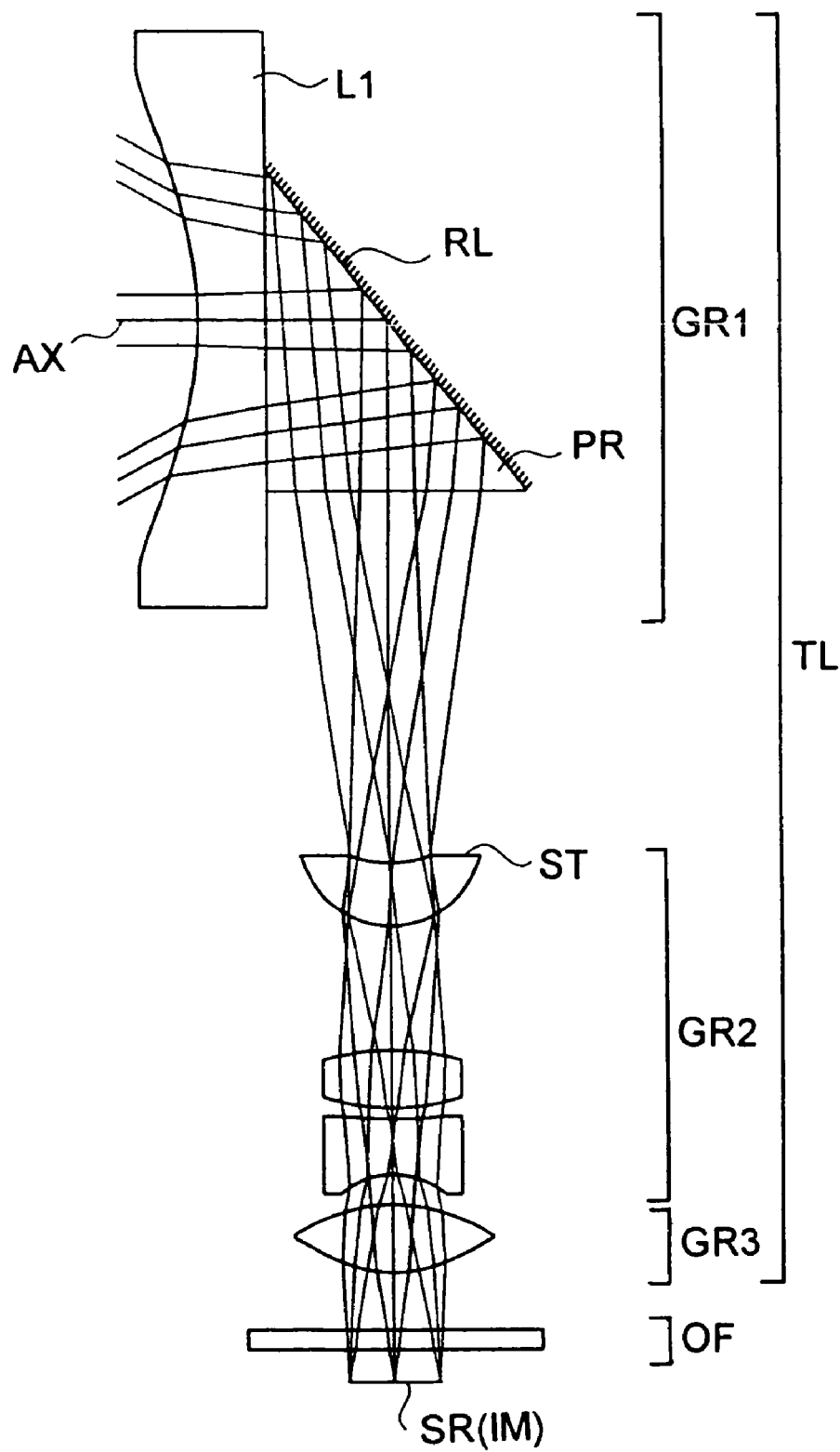
FIG. 10 is an optical construction diagram showing the optical path and the lens arrangement of the fifth embodiment (Example 5), with the optical path bent.
Figure 25C:
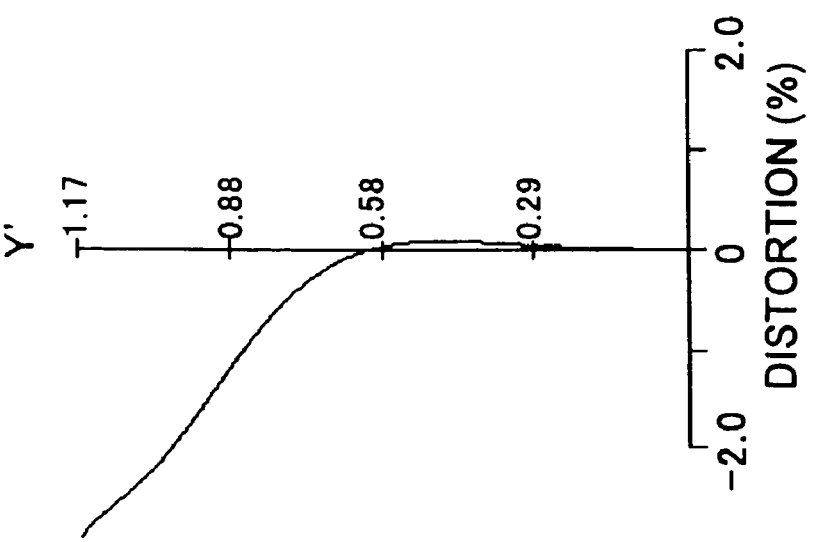
FIGS. 25A to 25C are aberration diagrams of Example 5, at the telephoto end.
Figure 25B:
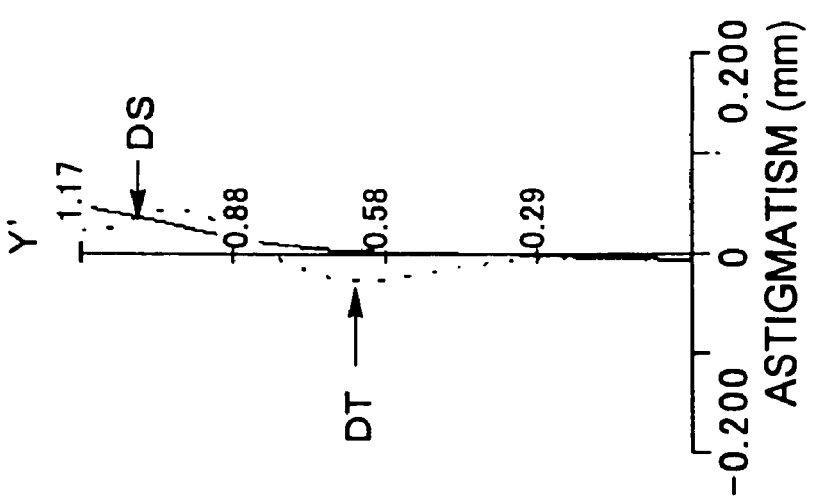
Figure 25A:
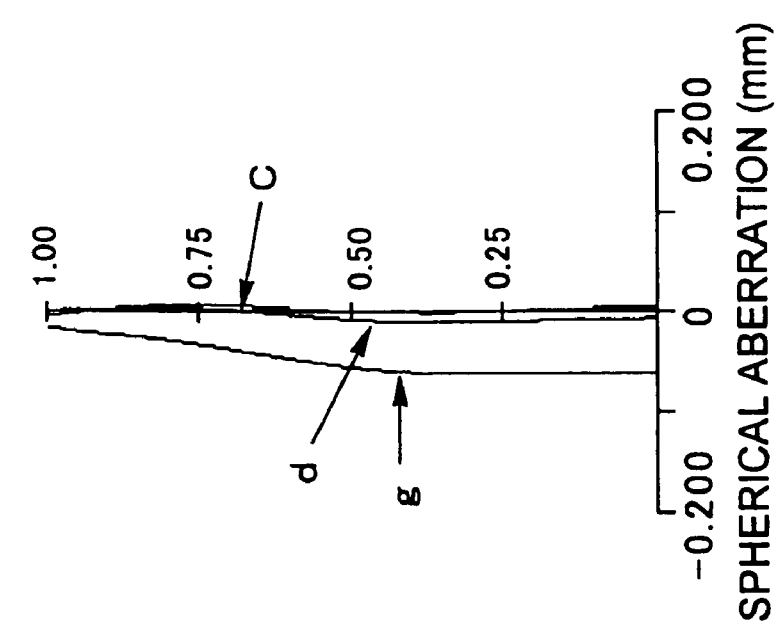
Figure 26:
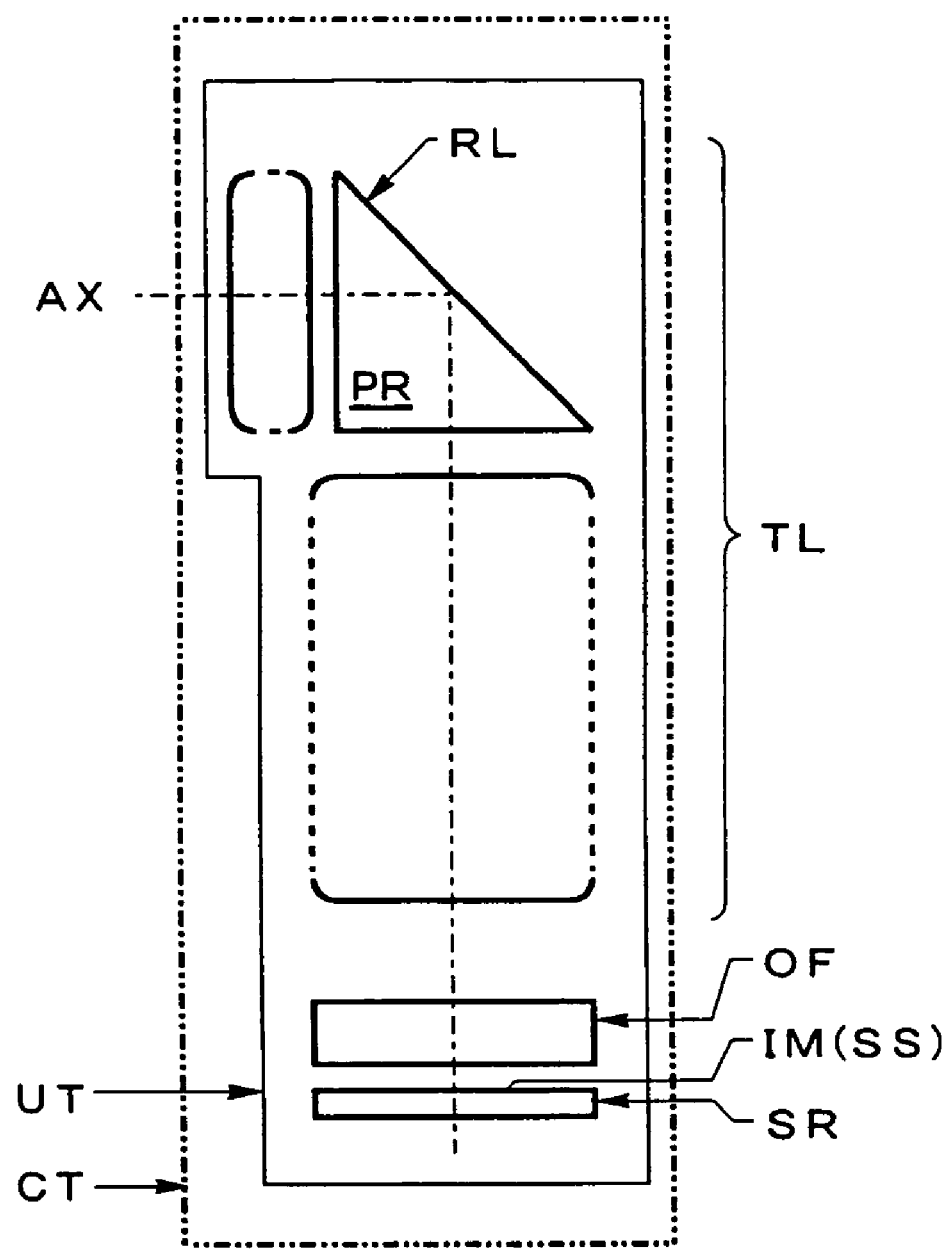
FIG. 26 is a diagram schematically showing an outline of the optical construction of an image-taking lens apparatus according to the invention.

FIG. 26 shows an example of the construction of an image-taking lens apparatus UT. This image-taking lens apparatus UT is composed of, from the object (i.e., subject) side thereof, an image-taking lens system TL for forming an optical image (image surface IM) of an object at a variable magnification, a parallel-plane plate OF (corresponding to an optical filter such as an optical low-pass filter or infrared cut filter arranged as required, and to the cover glass of an image sensor SR), and an image sensor SR for converting the optical image IM formed on the light-receiving surface SS thereof by the image-taking lens system TL into an electrical signal. The image-taking lens apparatus UT is used as a component of a digital appliance CT corresponding to a digital camera, portable data device (i.e., a compact and portable data equipment terminal such as a cellular phone or PDA), or the like. When this image-taking lens apparatus UT is incorporated in a digital camera, the image-taking lens apparatus UT is usually arranged inside the body of the camera. Here, the camera capability can be realized in a desired manner that suits particular needs. For example, the image-taking lens apparatus UT may be built as a unit that is freely detachable from or freely rotatable relative to the body of the camera; or the image-taking lens apparatus UT may be built as a unit that is freely detachable from or freely rotatable relative to a portable data device (such as a cellular phone or PDA).

The image-taking lens apparatus shown in FIG. 26 has a flat-surfaced reflective surface RL arranged in the middle of the optical path of the image-taking lens system TL, with at least one lens element disposed on the front side of the reflective surface RL and at least one lens element disposed on the rear side of the reflective surface RL. This reflective surface RL bends the optical path so that the image-taking lens system TL is used as a bending optical system. Here, the light beam is reflected in such a way that the optical axis AX is bent at about 90 degrees (i.e., precisely or substantially 90 degrees). By providing the reflective surface RL for bending the optical path in the optical path of the image-taking lens system TL in this way, it is possible to increase the flexibility in the arrangement of the image-taking lens apparatus UT, and it is also possible to vary the size of the image-taking lens apparatus UT in its thickness direction and thereby make it apparently slim.

The reflective member that constitutes the reflective surface RL mentioned above is a prism PR. In the image-taking lens apparatus UT shown in FIG. 26 and in the embodiments described later, a rectangular prism is used as the prism PR. However, the prism PR used is not limited to a rectangular prism. For example, it is possible to use instead a prism that reflects the light beam with two or more reflective surfaces in such a way that the optical axis AX of the image-taking lens system TL is bent at about 90 degrees. The optical effect used to bend the optical path is not limited to reflection. Specifically, it is possible to use instead refraction, diffraction, or a combination thereof. That is, it is possible to use a prism having a reflective, refractive, or diffractive surface, or a surface that produces a combined effect thereof.

The prism PR used in the image-taking lens apparatus UT shown in FIG. 26 and in the embodiments described later has no optical power (an optical power denotes the quantity defined as the reciprocal of a focal length). However, the prism PR for bending the optical path may be given an optical power. For example, by distributing part of the optical power of the image-taking lens system TL to the reflecting surface RL of the prism PR, the light-entrance-side surface thereof, the light-exit-side surface thereof, or any other surface thereof, it is possible to alleviate the responsibility of the lens elements for the optical power and thereby enhance the optical performance. In the embodiments described later, a first lens element L1 is disposed on the object side of the prism PR. Instead of disposing this first lens element L1, the object-side surface (i.e., the light-entrance-side surface) of the prism PR may be given a curvature so as to have a negative or positive optical power. The optical path may be bent in front of, in the middle of, or behind the image-taking lens system TL. Where to bend the optical path may be set appropriately to suit the actual needs. By appropriately bending the optical path, it is possible to make the digital appliance (such as a digital camera) CT incorporating the image-taking lens apparatus UT apparently slim and compact.

In the embodiments described later, used as the image-taking lens system TL is a zoom lens system that is composed of a plurality of lens units and that achieves zooming by varying the distances between those lens units. Accordingly, in the image-taking lens system TL of the embodiments, zooming is achieved (i.e., the magnification is varied) by moving at least one lens unit along the optical axis AX in such a way that the distances between the individual lens units are varied. As shown in FIG. 26, building the image-taking lens system TL as a bending optical system is effective in reducing the total length of an imaging optical system with a variable focal length, such as a zoom lens system or varifocal lens system, and thus helps make it compact as a whole. In this way, it is possible to effectively reduce the size and thickness of an image-taking lens apparatus.

Used as the image sensor SR is a solid-state image sensor such as a CCD (charge-coupled device) or CMOS (complementary metal oxide semiconductor) sensor having a plurality of pixels. The optical image formed by the image-taking lens system TL (on the light-receiving surface SS of the image sensor SR) is converted into an electrical signal by the image sensor SR. The signal produced by the image sensor SR is subjected to predetermined digital image processing, image compression processing, and the like as required, and is recorded in a memory (such as a semiconductor memory or an optical disk) as a digital video signal; in some cases, the signal is transferred to another appliance through a cable or after being converted into an infrared signal.

The optical image to be formed by the image-taking lens system TL passes through the optical low-pass filter (corresponding to the parallel-plane plate OF shown in FIG. 26) having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electric signal. This helps alleviate the generation of color moire. Aiming at moderate performance around the resolution limit frequency makes it possible to disregard the generation of noise without the use of an optical low-pass filter. Moreover, in a case where the user shoots or observes images by the use of a display system (such as the liquid crystal display screen of a cellular phone or the like) on which noise is inconspicuous, there is no need to use an optical low-pass filter in the image-taking lens system. Accordingly, in an image-taking lens apparatus that does not require an optical low-pass filter (for example, in the fifth embodiment), simply locating the exit pupil at an appropriate position makes it possible to reduce the back focal length and thereby miniaturize the image-taking lens apparatus and the camera incorporating it.

Used as the optical low-pass filter is a birefringence-type low-pass filter, phase-type low-pass filter, or low-pass filter of any other type. Examples of birefringence-type low-pass filters include those made of a birefringent material such as quartz having an appropriately aligned crystal axis and those composed of wavelength plates or the like, which change the polarization plane, laid on one another. Examples of phase-type low-pass filters include those that achieve required optical cut-off frequency characteristics by exploiting diffraction.

In the image-taking lens apparatuses UT shown in FIG. 26, the image-taking lens system TL performs reduction-projection from the subject located on the enlargement side to the image sensor SR located on the reduction side. It is, however, also possible to use instead of the image sensor SR a display device (for example, a liquid crystal display device) that displays a two-dimensional image, and use the image-taking lens system TL as a projection lens system. In this way, it is possible to realize an image projection apparatus that performs enlargement-projection from the image display surface located on the reduction side to a screen surface located on the enlargement side. That is, the zoom lens systems of the embodiments described below can be suitably used not only as an image-taking lens system TL but also as a projection lens system.

FIGS. 1 to 5 are optical construction diagrams corresponding to the zoom lens systems that are used as an image-taking lens system TL in a first to a fifth embodiment, respectively, each diagram showing the lens arrangement, optical path, and other features as observed at the wide-angle end W in an optical section, with the optical path straightened. FIGS. 6 to 10 are optical construction diagrams corresponding to the zoom lens systems that are used as an image-taking lens system TL in the first to fifth embodiments, respectively, each diagram showing the lens arrangement, optical path, and other features as observed at the wide-angle end W in an optical section with the optical path bent. In FIGS. 1 to 5, solid-line arrows m2, m3, m4, and m5 schematically indicate the movement of the second, third, fourth, and fifth lens units, GR2, GR3, GR4, and GR5, respectively, during zooming from the wide-angle end W to the telephoto end T, and broken-line arrows m1, m3, m4, and m5 indicate that the first, third, fourth, and fifth lens units, GR1, GR3, GR4, and GR5, respectively, are kept stationary during zooming. Arrow mF schematically indicates the movement of the focusing lens unit from the infinite photographing distance to a close-up photographing distance. Moreover, in FIGS. 1 to 5, a surface marked as ri (i=1, 2, 3, . . . ) is the i-th surface from the object side (with an asterisk (*) following ri indicating an aspherical surface), and an axial distance marked as di (i=1, 2, 3, . . . ) is the i-th axial distance from the object side, though only those axial distances which vary as zooming is performed, i.e., variable axial distances, are shown here.

In the zoom lens system of all the embodiments, a prism PR for bending the optical path is included in the first lens unit GR1. On the object side of the prism PR, i.e., at the object-side end of the first lens unit GR1, there is disposed a first lens element L1 having a negative optical power. Moreover, on the image surface IM side of the zoom lens system, there is disposed, as corresponding to an optical filter and the like, a parallel-plane plate OF composed of a single glass plate or two glass plates. Now, the lens construction of the zoom lens unit used in each embodiment will be described in more detail.

In the first embodiment (FIGS. 1 and 6), in a four-unit zoom construction composed of a negative, a positive, a negative, and a positive lens unit, each lens unit is built as follows. The first lens unit GR1 is composed of, from the object side, a first lens element L1, a second lens element L2, and a third lens element L3, with a prism PR inserted between the first and second lens elements L1 and L2. The first lens element L1 is a negative meniscus lens element having an aspherical surface on one side and concave to the image side. The prism PR is a rectangular prism having a reflective surface RL (FIGS. 6 and 26) for bending the optical axis AX at 90 degrees. The second lens element L2 is a biconcave negative lens element. The third lens element L3 is a positive meniscus lens element convex to the object side. The second and third lens elements L2 and L3 together form a cemented lens element. The second lens unit GR2 is composed of, from the object side, an aperture stop ST, a biconvex positive lens element, a cemented lens element formed by cementing together a biconcave negative lens element and a biconvex positive lens element, and a negative meniscus lens element having an aspherical surface on one side and concave to the image side. The third lens unit GR3 is composed of a negative meniscus lens element having aspherical surfaces on both sides and concave to the object side. The fourth lens unit GR4 is composed of, from the object side, a biconvex positive lens element having an aspherical surface on one side, and a negative meniscus lens element concave to the object side.

In the second embodiment (FIGS. 2 and 7), in a five-unit zoom construction composed of a negative, a positive, a negative, a positive, and a negative lens unit, each lens unit is built as follows. The first lens unit GR1 is composed of, from the object side, a first lens element L1, a second lens element L2, and a third lens element L3, with a prism PR inserted between the first and second lens elements L1 and L2. The first lens element L1 is a negative lens element having an aspherical surface on the object side, having a flat surface on the image side, and concave to the object side. The prism PR is a rectangular prism having a reflective surface RL (FIGS. 7 and 26) for bending the optical axis AX at 90 degrees, and is cemented to the first lens element L1. The second lens element L2 is a biconcave negative lens element having an aspherical surface on the object side. The third lens element L3 is a biconvex positive lens element. The second and third lens elements L2 and L3 together form a cemented lens element. The second lens unit GR2 is composed of, from the object side, an aperture stop ST, a positive meniscus lens element convex to the object side, a cemented lens element formed by cementing together a biconcave negative lens element and a biconvex positive lens element, and a positive meniscus lens element having aspherical surfaces on both sides and convex to the image side. The third lens unit GR3 is composed of a biconcave negative lens element. The fourth lens unit GR4 is composed of, from the object side, a negative meniscus lens element concave to the object side, and a biconvex positive lens element having aspherical surfaces on both sides. The fifth lens unit GR5 is composed of a negative meniscus lens element concave to the object side.

In the third embodiment (FIGS. 3 and 8), in a four-unit zoom construction composed of a negative, a positive, a positive, and a negative lens unit, each lens unit is built as follows. The first lens unit GR1 is composed of, from the object side, a first lens element L1, a second lens element L2, and a third lens element L3, with a prism PR inserted between the first and second lens elements L1 and L2. The first lens element L1 is a negative meniscus lens element having an aspherical surface on one side and concave to the image side. The prism PR is a rectangular prism having a reflective surface RL (FIGS. 8 and 26) for bending the optical axis AX at 90 degrees. The second lens element L2 is a biconcave negative lens element. The third lens element L3 is a biconvex positive lens element. The second and third lens elements L2 and L3 together form a cemented lens element. The second lens unit GR2 is composed of, from the object side, an aperture stop ST, a positive meniscus lens element convex to the object side, a cemented lens element formed by cementing together a biconvex positive lens element and a biconcave negative lens element, and a negative meniscus lens element having aspherical surfaces on both sides and convex to the image side. The third lens unit GR3 is composed of, from the object side, a biconcave negative lens element, and a biconvex positive lens element having aspherical surfaces on both sides. The fourth lens unit GR4 is composed of a negative lens element having a concave surface on the object side and having a flat surface on the image side.

In the fourth embodiment (FIGS. 4 and 9), in a five-unit zoom construction composed of a positive, a negative, a positive, a positive, and a positive lens unit, each lens unit is built as follows. The first lens unit GR1 is composed of, from the object side, a first lens element L1 and a second lens element L2, with a prism PR inserted between the first and second lens elements L1 and L2. The first lens element L1 is a negative meniscus lens element concave to the image side. The prism PR is a rectangular prism having a reflective surface RL (FIGS. 9 and 26) for bending the optical axis AX at 90 degrees. The second lens element L2 is a biconvex positive lens element. The second lens unit GR2 is composed of, from the object side, a biconcave negative lens element having aspherical surfaces on both sides, and a positive meniscus lens element convex to the object side. The third lens unit GR3 is composed of an aperture stop ST, and a biconvex positive lens element. The fourth lens unit GR4 is composed of a cemented lens element formed by cementing together a biconvex positive lens element and a biconcave negative lens element having an aspherical surface on one side. The fifth lens unit GR5 is composed of a biconvex positive lens element having aspherical surfaces on both sides.

In the fifth embodiment (FIGS. 5 and 10), in a three-unit zoom construction composed of a negative, a positive, and a positive lens unit, each lens unit is built as follows. The first lens unit GR1 is composed of, from the object side, a first lens element L1 and a prism PR. The first lens element L1 is a negative lens element having an aspherical surface on one side. The prism PR is a rectangular prism having a reflective surface RL (FIGS. 10 and 26) for bending the optical axis AX at 90 degrees. The first lens element L1 and the prism PR are cemented together. The second lens unit GR2 is composed of, from the object side, an aperture stop ST, a positive meniscus lens element having aspherical surfaces on both sides and convex to the image side, a biconvex positive lens element, and a biconcave negative lens element. The third lens unit GR3 is a biconvex positive lens element having aspherical surfaces on both sides.

In general, as opposed to when a mirror is used to bend the optical path, when the optical path is bent by the use of a prism, light passes through a medium having a refractive index higher than 1, and accordingly the axial distance over which the object light travels when it passes through the prism is physically shorter. This makes it possible to realize an optically equivalent construction in a more compact space. Thus, using a prism rather than a mirror to bend the optical path helps reduce the total length of an image-taking lens system and thereby make the image-taking lens system more compact. Furthermore, the higher the refractive index of the prism, the more compact the space in which an optically equivalent construction can be realized.

Figure 27:
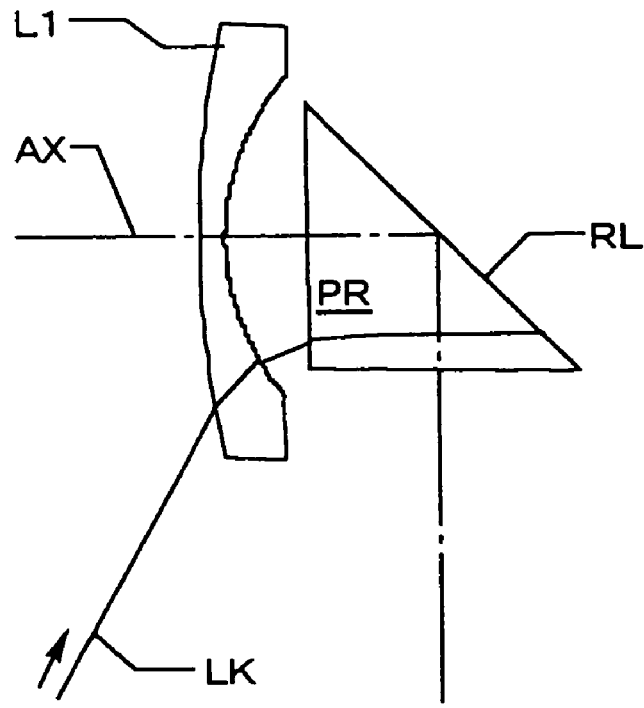
FIG. 27 is a diagram schematically showing how the most off-axial ray is deflected when a prism is used to bend the optical path.
Figure 28:
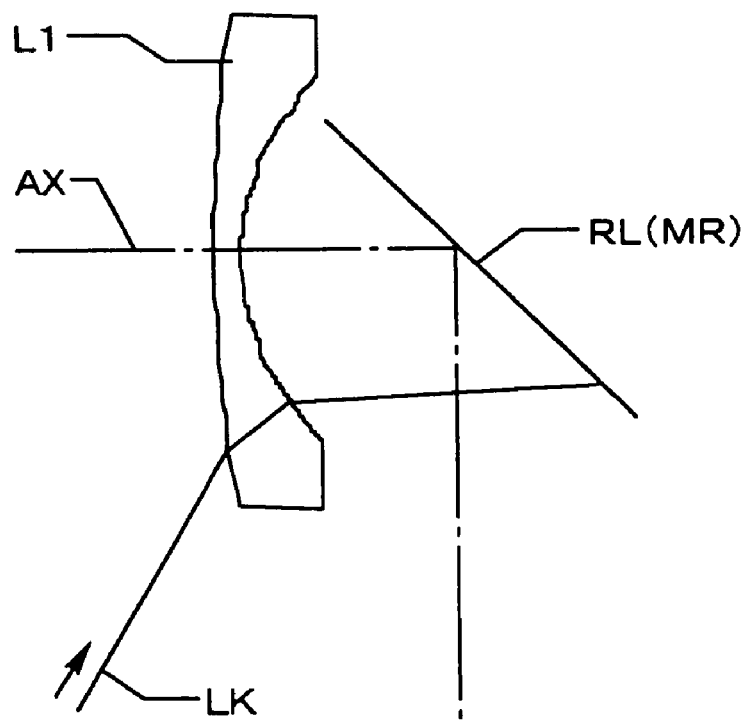
FIG. 28 is a diagram schematically showing how the most off-axial ray is deflected when a mirror is used to bend the optical path

In a case where, as in the embodiments, the image-taking lens system TL includes at least one lens element having a negative optical power on the object side of the prism PR, by reducing the angle of the most off-axial ray with respect to the entrance-side optical axis AX as observed where the optical path is bent, it is possible to make compact the space required to bend the optical path (which space corresponds to the thickness that the prism PR is supposed to have when the optical path is straightened). This makes important the relationship between the refractive index of the negative lens element disposed on the object side of the prism PR and the refractive index of the prism PR. Now, this relationship will be described with respect to a case where a prism PR is used to bend the optical path as shown in FIG. 27 and a case where a mirror MR is used to bend the optical path as shown in FIG. 28. In either case, a first lens element L1 having a negative optical power is disposed on the object side of the reflective member, and, where the optical path is bent (i.e., where the reflective surface RL is located), the most off-axial ray LK forms the same angle with respect to the entrance-side optical axis AX.

In a case where a prism PR is used to bend the optical path as shown in FIG. 27, the most off-axial ray LK, which is incident at a large angle of incidence, is refracted by the negative first lens element L1 so as to have a smaller angle with respect to the entrance-side optical axis AX. Since the prism PR has a refractive index higher than 1, the most off-axial ray LK is then further refracted by the prism PR so as to have a still smaller angle with respect to the entrance-side optical axis AX. That is, there are two factors, namely the negative optical power of the first lens element L1 and the refractive index of the prism PR, that act to make the angle of incidence of the most off-axial ray LK smaller with respect to the entrance-side optical axis AX. On the other hand, in a case where a mirror MR is used to bend the optical path as shown in FIG. 28 (equivalent to a case where a prism having a refractive index of 1, equal to that of air, is used), to make the most off-axial ray LK incident on the reflective surface RL at the same angle as when the prism PR is used, the negative optical power of the first lens element L1 needs to be increased. Giving the first lens element L1 too high a negative optical power is undesirable because doing so results in larger distortion and larger curvature of field. Accordingly, to make the space required to bend the optical path compact, using a prism PR is preferable to using a mirror, and, the higher the refractive index of the prism PR used, the better. The higher the refractive index of the prism PR, the more the responsibility of the first lens element Li for the optical power is alleviated, and thus the lower the negative power thereof can be made. This makes it possible to maintain high optical performance without increasing distortion and curvature of field.

In general, the third-order aberration coefficients of field of curvature and distortion on a surface v in an optical system are, when calculated in a simplified manner, given by formulae (F1) and (F2) below (according to "Lens Designs" by Yoshiya MATSUI).

$$III_v = h_v{}^2 \cdot [h_v]^2 \cdot \{A\} \tag{F1}$$

$$V_v = h_v \cdot [h_v]^3 \cdot \{A\} + [h_v]^2 \cdot \{B\} \tag{F2}$$

where
  III$_v$ represents the third-order aberration coefficient of curvature of field;
  V$_v$ represents the third-order aberration coefficient of distortion;
  h$_v$ represents the height of incidence of a paraxial ray on the surface v; and
  [hv] represents the height of incidence of the most off-axial principal ray on the surface v.

Formulae (F1) and (F2) above show that the square and cube of the height of incidence [hv] affect the aberration coefficient III$_v$ of curvature of field and the aberration coefficient V$_v$ of distortion, respectively. This means that the curvature of field and distortion occurring in the negative first lens element L1 can be reduced by reducing the height of incidence [hv]. This can be achieved by making the space required to bend the optical path as small as possible and bringing the negative first lens element L1 closer to the aperture stop ST. Accordingly, to make the axial distance over which the object light travels when it passes through the prism PR physically shorter, it is preferable to increase the refractive index of the prism PR.

From the viewpoints described above, the higher the refractive index of the prism used in an image-taking lens system to bend the optical path, the better. Specifically, it is preferable that conditional formula (1) below be fulfilled.

$$Ndp > 1.9 \tag{1}$$

where
  Ndp represents the refractive index for the d-line of the prism.

Conditional formula (1) defines the conditional range that should preferably be fulfilled with respect to the refractive index of the prism. Fulfilling the conditional formula (1) makes it possible to reduce the total length of the image-taking lens system and thereby make the image-taking lens apparatus slim and compact. If the lower limit of conditional formula (1) is disregarded, the prism has too low a refractive index, and thus the axial length over which the object light travels when passing through the prism is physically unduly long. Attempting to maintain the same total length of the image-taking lens system results in lower optical performance. By contrast, attempting to maintain the optical performance results in making the total length of the image-taking lens system unduly great, and thus makes it difficult to achieve satisfactory compactness.

It is further preferable that conditional formula (1a) below be fulfilled.

$$Ndp > 1.95 \tag{1a}$$

This conditional formula (1a) defines a further preferable conditional range within that defined by conditional formula (1) above from the above-mentioned viewpoints and out of other considerations. By fulfilling conditional formula (1a), it is possible to achieve still higher optical performance, and to further reduce the total length of the image-taking lens system and thereby achieve further compactness.

It is further preferable that conditional formula (1b) below be fulfilled.

$$Ndp > 2.00 \tag{1b}$$

This conditional formula (1b) defines a further preferable conditional range within that defined by conditional formula (1a) above from the above-mentioned viewpoints and out of other considerations. By fulfilling conditional formula (1b), it is possible to achieve still higher optical performance, and to further reduce the total length of the image-taking lens system and thereby achieve further compactness.

In a case where, as in a conventional image-taking lens apparatus, the optical elements, such as lens elements and an aperture stop, constituting a zoom lens system are arranged linearly without changing the direction of the optical axis, the dimension of the image-taking lens apparatus in its thickness direction is practically determined by the distance from the most object-side optical element of the zoom lens system to an image sensor. On the other hand, as the image processing power of semiconductor devices and the like increases, image-taking lens apparatuses incorporated in personal computers, mobile computers, cellular phones, personal digital assistants, and the like have come to be required to offer increasingly high resolution, high magnification, and high image quality, as opposed to conventional simple types. Correspondingly, zoom lens systems for use in such image-taking lens apparatuses have come to include an increasingly large number of lens elements. This makes it difficult to achieve satisfactory slimness because of the thickness of lens elements even in the not-in-use state (i.e., a so-called collapsed state).

By contrast, as in the zoom lens systems used in the embodiments, adopting a construction in which the object light is reflected with a reflective surface RL so that the optical axis AX is bent at substantially 90° makes it possible to reduce the dimension of the image-taking lens apparatus UT in its thickness direction down to the distance from the most object-side lens element, namely the first lens element L1, to the reflective surface RL. This helps make the image-taking lens apparatus UT apparently slim and compact. Moreover, adopting a construction in which the optical axis AX is bent at substantially 90° with a reflective surface RL permits the optical path of the object light to have an overlap near the reflective surface RL. This makes it possible to effectively use space and thereby make the image-taking lens apparatus UT more compact.

In a case where, as in the embodiments, a zoom lens system is used as the image-taking lens system TL, it is preferable to dispose the reflective surface RL within the first lens unit GR1. By disposing the reflective surface RL within the first lens unit GR1, which is located at the object-side end, it is possible to minimize the dimension of the image-taking lens apparatus UT in its thickness direction. As necessary, the angle at which the optical axis AX is bent may be set at any other angle than 90 degrees. However, the closer the angle at which the optical axis AX is bent is to 90 degrees, the more compact the image-taking lens apparatus UT can be made. Accordingly, it is preferable that the angle at which the optical axis AX is bent be set as close as possible to 90 degrees.

The screen of a common image sensor is rectangular in shape, and so is the screen of the image sensor SR used in the embodiments, specifically, it has the shape of a rectangle of which the longer and shorter sides fulfill a ratio of 4:3 in length. Thus, to make the image-taking lens apparatus UT slim, it is preferable to bend the optical path in the direction of the shorter sides of the image sensor SR. It is to be noted that, while in FIGS. 6 to 10 the optical path is bent in the direction of the shorter sides of the image sensor SR, in FIGS. 1 to 5 the prism PR is illustrated as a parallel-plane plate so that the optical path is shown in a straightened form.

As described earlier, in the zoom lens systems used in the embodiments, the first lens unit GR1 includes a prism PR as a reflective member. The prism PR used in the embodiments is a rectangular prism, and is built as an internal-reflection prism that reflects a light beam with a reflective surface RL provided inside it in such a way that the optical axis AX of the zoom lens system is bent at about 90 degrees. As the reflective member that provides the reflective surface, it is possible to use, instead of an internal-reflection prism, any of the following and other known types of reflective member: a surface-reflection prism, an internal-reflection flat mirror, a surface-reflection flat mirror, and the like. While an internal-reflection prism reflects the object light inside itself, a surface-reflection prism reflects the object light with a surface thereof serving as the reflective surface without letting the object light enter it. On the other hand, while a surface-reflection flat mirror reflects the object light with a mirror surface thereof serving as the reflective surface, an internal-reflection flat mirror reflects, with the back surface of a glass plate serving as the reflective surface, the object light that has entered the glass plate. Of these different types of reflective member, the internal-reflection prism is most suitable to make a digital appliance CT (FIG. 26), such as a digital camera or portable data device, slim.

In a case where an internal-reflection prism is adopted as the prism PR, the object light passes through the medium of the prism and thus, as described earlier, the axial distance over which the object light travels when it passes through the prism is physically shorter than otherwise. Thus, by adopting an internal-reflection prism to obtain the reflective surface RL, it is possible to realize an optically equivalent construction in a more compact space. The reflective surface RL does not have to be a perfectly total-reflection surface. That is, the reflectivity of part of the reflective surface RL may be appropriately adjusted so as to make part of the object light branch off and strike a sensor for metering or distance measurement. The reflectivity of the entire reflective surface RL may be adjusted appropriately so as to split the object light into two beams and direct one to a viewfinder.

As described earlier, the first lens unit GR1 includes, as a reflective member, the prism PR that reflects the light beam in such a way that the optical axis AX of the zoom lens system is bent at about 90 degrees. Here, it is preferable to dispose only the negative first lens element L1 on the object side of the prism PR. By disposing a single lens element on the object side of the prism PR, i.e., by disposing, as an optical element having an optical power, only the first lens element L1 on the object side of the prism PR, it is possible to reduce the width of the zoom lens system as measured with the optical axis AX thereof bent (i.e., the length of the zoom lens system along the optical axis AX as measured in the entrance-side part of the zoom lens system), and thereby make the image-taking lens apparatus UT slim. Furthermore, by using a negative lens element as the first lens element L1, it is possible to obtain a wide angle of view, and to reduce the front lens diameter.

It is preferable that the first lens element, which is disposed at the object-side end within the first lens unit, be disposed on the object side of the prism for bending the optical path, and in addition that conditional formula (2) below be fulfilled.

$$0.4 < |fIL/fIG| < 1.2 \tag{2}$$

where fIL represents the focal length of the first lens element (fIL<0); and fIG represents the focal length of the first lens unit.

Conditional formula (2) defines the conditional range that should preferably be fulfilled with respect to the optical power of the first lens element. If the lower limit of conditional formula (2) is disregarded, the optical power of the first lens element is too strong, resulting in large distortion and curvature of field. By contrast, if the upper limit of conditional formula (2) is disregarded, the optical power of the first lens element is too weak, and thus the first lens element cannot bend the most off-axial ray, which is incident at a large angle of incidence, in such a way that it comes to have a sufficiently small angle with respect to the entrance-side optical axis. This results in making the prism unduly large.

It is further preferable that conditional formula (2a) below be fulfilled.

$$0.6 \leq |fIL/fIG| \leq 1.0 \tag{2a}$$

This conditional formula (2a) defines a further preferable conditional range within that defined by conditional formula (2) above from the above-mentioned viewpoints and out of other considerations. Fulfilling conditional formula (2a) makes it possible to strike a proper balance between the optical performance and the total length of the zoom lens system.

In the embodiments, the entrance-side and exit-side surfaces of the prism PR are both formed flat. In addition, in the second and fifth embodiments, the exit-side surface of the first lens element L1 also is formed flat, and the exit-side surface of the first lens element L1 and the entrance-side surface of the prism PR are cemented together (i.e., the axial distance between these surfaces is zero). Here, the prism PR and the first lens element L1 have different refractive indices. If these two have an equal refractive index, they can be formed integrally. This, however, means that the entrance-side surface of the prism is not flat but curved. This is undesirable because, when consideration is given to the technology of glass molding and of plastic injection molding and to the after-molding machining of a prism, serious problems are left to be solved in terms of the manufacture of the prism. For example, manufacturing errors arising in integral molding may result in degraded performance, and the manufacturing difficulty of integral molding itself may result in higher costs.

In a zoom lens system where, as in the embodiments, the first lens unit GR1 has a negative optical power, it is generally extremely difficult to correct the distortion and curvature of field occurring at the wide-angle end W. This problem can usually be solved by increasing the number of lens elements used. However, increasing the number of lens elements may result in lower aberration-correcting performance. For example, in a case where, as in the first embodiment, the prism PR is inserted between the first lens element L1 and the cemented lens element L2 and L3, the image-side principal point of the first lens unit GR1 is located much closer to the object side and the first lens unit GR1 has a weaker optical power than when no prism PR is provided. To obtain the same optical power, the individual lens elements need to be given stronger optical powers. However, giving them stronger optical powers results in larger curvature of field. In the first to third and fifth embodiments, an aspherical surface is introduced in the first lens element L1 to correct the distortion, astigmatism, and other aberrations that are inevitable in this construction. Moreover, by introducing an aspherical surface in the first lens element L1, it is possible to give the first lens element L1 a strong optical power, with the result that it is possible to reduce the optical path width in the prism PR. To obtain this effect, it is preferable that the aspherical surface introduced in the first lens element L1 be so shaped that the negative optical power of the first lens element L1 decreases away from the optical axis AX.

In the fifth embodiment, the first lens unit GR1 is composed solely of a first lens element L1 and a prism PR. This helps make the image-taking lens system TL compact, but makes it difficult to correct chromatic and other aberrations. Accordingly, for satisfactory correction of various aberrations, as in the first to fourth embodiment, it is preferable that the first lens unit GR1 include at least one lens element on the image side of the prism PR, and it is further preferable that the first lens unit GR1 include at least one positive lens element on the image side of the prism PR. Thus, it is preferable that the first lens unit GR1 be composed of, from the object side, a first lens element L1 having an aspherical surface and having a negative optical power, a prism PR that reflects a light beam in such a way that the optical axis AX of the zoom lens system is bent at about 90 degrees, and at least one positive lens element. It is further preferable that the lens group (within the first lens unit GR1) disposed on the image side of the prism PR have a positive optical power.

Moreover, to satisfactorily correct chromatic and other aberrations within the first lens unit GR1, as in the first to third embodiments, it is preferable that the first lens unit GR1 include, on the image side of the prism PR, at least one positive lens element and at least one negative lens element. Thus, by building the first lens unit GR1 with, from the object side, a first lens element L1 having an aspherical surface and having a negative optical power, a prism PR that reflects a light beam in such a way that the optical axis AX of the zoom lens system is bent at about 90 degrees, and a lens group consisting of at least one negative lens element and at least one positive lens element, it is possible to satisfactorily correct distortion, astigmatism, and other aberrations in a compact construction.

As in the embodiments (FIGS. 1 to 5), it is preferable that the first lens unit GR1 is kept in a fixed position with respect to the image surface IM during zooming from the wide-angle end W to the telephoto end T. By keeping the first lens unit GR1 in a fixed position during zooming, it is possible to reduce the length of the zoom lens system along the optical axis AX as measured in the entrance-side part of the zoom lens system. This makes it possible to reduce the size and increase the magnification of the zoom lens system, and to make the image-taking lens apparatus UT and the digital appliance CT slim. Since the first lens unit GR1 includes the reflective surface RL, moving the first lens unit GR1 requires a large space. In particular, in a case where the reflective surface RL is realized by the use of a prism PR, moving the prism PR, which is heavy, imposes a heavy burden on the drive mechanism. By keeping the first lens unit GR1 in a fixed position with respect to the image surface IM during zooming as described above, it is possible to avoid such a problem, and it is also possible to obtain a zoom lens system of which the total length does not vary (i.e., of which the thickness does not vary even when zooming is performed or when the zoom lens system is collapsed). A zoom lens system of which the total length does not vary can be, as a whole, held in position with a box-shaped structure, and can thus be held with a highly rigid structure.

A lens group (for example, a lens group that functions as a condenser) that is kept in a fixed position with respect to the image surface IM during zooming from the wide-angle end W to the telephoto end T may additionally be disposed near the image surface IM. Slightly higher performance is expected when a lens group that is kept in a fixed position during zooming and that has a positive or negative optical power is added near the image surface IM. Even in this case, it is possible the obtain effects comparable to those achieved by the zoom lens systems used in the embodiments.

Providing an aperture stop ST or a shutter on the image side of the prism PR as in the embodiments is effective in making the image-taking lens apparatus UT compact and slim. To make a digital camera slim, it is essential that optical components such as lenses and a prism be arranged in a thin space. In addition it is also essential that the construction including a lens barrel and drive components be compact. In the first to third and fifth embodiment, the aperture stop ST is disposed at the object-side end within the second lens unit GR2, and is moved, as part of the second lens unit GR2, during zooming. In a common digital camera, a mechanical shutter is disposed at the position of the aperture stop ST. Using a mechanical shutter, however, requires securing a space into which the light-shielding member thereof can retract, and in addition requires drive components such as a drive motor. Thus, it is necessary to secure a considerably large space.

In a case where, as in the first to third and fifth embodiments, the aperture stop ST is moved along with a movable unit during zooming, if a mechanical shutter, which requires a large space, is mounted on the movable unit, the movable unit as a whole becomes unduly large. In addition, an unduly heavy burden is imposed on the drive unit. This may result in an extremely large construction as a whole. That is, even only compact optical components are used, it may be difficult to achieve compactness depending on the construction adopted. Accordingly, in the first to third embodiments, it is preferable, to achieve compactness in the entire construction inducing the mechanical construction, that a shutter mechanism be not mounted on a movable unit. It is preferable that a shutter mechanism be disposed on the image surface IM side of the third lens unit GR3, which is kept stationary during zooming. By using as the image sensor SR a solid-state image sensor having an electronic shutter capability helps make the image-taking lens apparatus UT more compact.

In the embodiments, the zoom lens system is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, it is preferable to use lens elements formed out of a uniform material. In addition to the aperture stop ST, a beam restricting plate or the like for cutting unnecessary light may be arranged as necessary.

In the first and second embodiments, focusing at a close-up distance is achieved by moving out the fourth lens unit GR4 toward the object side (as indicated by the arrow mF); in the third and fifth embodiment, focusing at a close-up distance is achieved by moving out the third lens unit GR3 toward the object side (as indicated by the arrow mF); in the fourth embodiment, focusing at a close-up distance is achieved by moving out the fifth lens unit GR5 toward the object side (as indicated by the arrow mF). Conventionally, zooming is achieved by driving a plurality of lens units by the use of the drive power transmitted thereto from a single drive device through a zoom cam, and focusing is achieved by driving a focus lens unit by the use of the drive power of a separate drive device. However, in a construction where, as in the embodiments, there are two lens units that are moved for zooming or focusing, a drive device can be connected directly to each of those two lens units without using a cam or the like. It is preferable to achieve zooming and focusing by controlling the distances traveled by the individual lens units, because this eliminates the need for a cam and thus helps simplify the construction, leading to slimness.

It is to be understood that the embodiments described above and the practical examples presented later include the constructions described below, and with these constructions, it is possible to realize zoom lens systems that offer good optical performance despite being compact. By using them as image-taking lens systems in digital cameras, portable data devices (such as cellular phones and PDAs), and the like, it is possible to contribute to making such devices lightweight, compact, inexpensive, high-performance, intelligent, and otherwise better.

(Z1) A zoom lens system that is composed of a plurality of lens units and that achieves zooming by varying the distances between those lens units, wherein a prism for bending the optical path is included, and at least one of conditional formulae (1), (1a), and (1b) noted earlier is fulfilled.

(Z2) A zoom lens system as described in (Z1) above, wherein at least one negative lens element is disposed on the object side of the prism.

(Z3) A zoom lens system as described in (Z1) or (Z2) above, wherein, assuming that the lens unit disposed at the object-side end is the first lens unit, the first lens unit includes the prism.

(Z4) A zoom lens system as described in one of (Z1) to (Z3) above, wherein, assuming that the lens unit disposed at the object-side end is the first lens unit and that the lens element disposed at the object-side end within the first lens unit is the first lens element, the first lens element is disposed on the object side of the prism, and at least one of conditional formulae (2) and (2a) noted earlier is fulfilled.

(Z5) A zoom lens system as described in one of (Z1) to (Z4) above, wherein, assuming that the lens unit disposed at the object-side end is the first lens unit, the first lens unit includes the prism, and at least one lens element is included on the image side of the prism.

(Z6) A zoom lens system as described in one of (Z1) to (Z5) above, wherein, assuming that the lens unit disposed at the object-side end is the first lens unit, the first lens unit includes the prism, and at least one positive lens element and at least one negative lens element are included on the image side of the prism.

(Z7) A zoom lens system as described in one of (Z1) to (Z6) above, wherein an aperture stop or a shutter is disposed on the image side of the prism.

(U1) An image-taking lens apparatus comprising a zoom lens system as described in one of (Z1) to (Z7) above and an image sensor for converting the optical image formed by the zoom lens system into an electrical signal.

(C1) A camera comprising an image-taking lens apparatus as described in (U1) above so as to have at least one of a capability of shooting a still picture of a subject and a capability of shooting a moving picture of a subject.

(C2) A camera as described in (C1) above, wherein the camera is a digital camera, video camera, or a camera incorporated in or externally fitted to a cellular phone, personal digital assistant, personal computer, mobile computer, or peripheral device therefor.

(D1) A digital appliance comprising an image-taking lens apparatus as described in (U1) above so as to have at least one of a capability of shooting a still picture of a subject and a capability of shooting a moving picture of a subject.

(D2) A digital appliance as described in (D1) above, wherein the digital appliance is a cellular phone, personal digital assistant, personal computer, mobile computer, or peripheral device therefor.

EXAMPLES

Hereinafter, the construction and other features of practical examples of the zoom lens system used in an image-taking lens apparatus embodying the present invention will be presented with reference to their construction data and other data. Examples 1 to 5 presented below are numerical examples corresponding to the first to fifth embodiments, respectively, described hereinbefore, and therefore the optical construction diagrams (FIGS. 1 to 10) of the first to fifth embodiments also show the lens construction of Examples 1 to 5, respectively.

Tables 1 to 10 show the construction data of Examples 1 to 5. Table 11 shows the values of the conditional formulae and the data related thereto as actually observed in each example. In Tables 1, 3, 5, 7, and 9, $\lambda_0$ represents the design wavelength (in nm), Y'max represents the maximum image height on the light-receiving surface SS of the image sensor SR (corresponding to the distance from the optical axis AX, in mm), and f and Fno respectively represent the focal length (in mm) and f-number of the entire system at different focal lengths (W, M, and T). Here, W denotes the wide-angel end (the shortest-focal-length state), M denotes the middle position (the middle-focal-length state), and T denotes the telephoto end (the longest-focal-length state). Tables 1, 3, 5, 7, and 9 show, for the respective examples, the basic optical construction (with "i" representing the surface number) from the object plane OB to the image surface IM. In these tables, ri (i=0, 1, 2, 3, . . . ) represents the radius of curvature (in mm) of the i-th surface from the object side, di (i=0, 1, 2, 3, . . . ) represents the axial distance (in mm) between the i-th and (i+1)-th surfaces from the object side (with d0 representing the object distance), and Ni (i=1, 2, 3, . . . ) and vi (i=1, 2, 3, . . . ) respectively represent the refractive index (Nd) for the d-line and the Abbe number (vd) of the optical material filling the axial distance di.

A surface of which the radius of curvature ri is marked with an asterisk (*) is an aspherical surface (a refractive optical surface having an aspherical shape, a surface exerting an refracting effect equivalent to that of an aspherical surface, or the like), of which the surface shape is defined by formula (AS) below. Tables 2, 4, 6, 8, and 10 show the aspherical surface data of the respective examples. It should be noted that any coefficient that is not shown equals 0, and that, for all the data, "E−n" represents "×10$^{-n}$" and "E+n" represents "×10$^{+n}$"). An air gap of which the axial distance di is marked with a number sign (#) has a variable axial distance, i.e., an axial distance that varies as zooming is performed. Tables 2, 4, 6, 8, and 10 show the variable axial distance data as actually observed in the different focal-length conditions W, M, and T in the respective examples.

$$x = (C0 \cdot y^2)/\{1+[1-(1+K) \cdot C0^2 \cdot y^2]^{1/2}\} + \Sigma(Aj \cdot y^j) \quad \text{(AS)}$$

where
 x represents the displacement along the optical axis AX at the height y (relative to the vertex);
 y represents the height in a direction perpendicular to the optical axis AX;
 C0 represents the paraxial curvature (=1/ri);
 K represents the conic coefficient; and
 Aj represents the aspherical coefficient of the j-th order.

FIGS. 11A to 13C, FIGS. 14A to 16C, FIGS. 17A to 19C, FIGS. 20A to 22C, and FIGS. 23A to 25C are aberration diagrams of Examples 1 to 5, respectively, as observed with the focus at infinity. Of these aberration diagrams, those with numbers 11, 14, 17, 20, and 23 show the aberrations observed at the wide-angle end W, those with numbers 12, 15, 18, 21, and 24 show the aberrations observed at the middle M, and those with numbers 13, 16, 19, 22, and 25 show the aberrations observed at the telephoto end T. Of these aberration diagrams, those with numbers suffixed with A show spherical aberration etc., those with numbers suffixed with B show astigmatism, and those with numbers suffixed with C show distortion. In the spherical aberration diagrams (those with numbers suffixed with A), the lines d, C and g represent the spherical aberration (mm) observed for the d-line (with a wavelength of λ0=587.56 nm), C-line (with a wavelength of 656.28 nm), and g-line (with a wavelength of 435.84 nm), respectively, as deviations (taken along the horizontal axis, in mm) from the paraxial image surface along the optical axis AX, and along the vertical axis is taken the height of incidence at the pupil as normalized relative to the maximum height thereof (i.e., the relative pupil height). In the astigmatism diagrams (those with numbers suffixed with B), the broken line DT and solid line DS represent the tangential image surface and sagittal image surface, respectively, observed for the d-line as deviations (taken along the horizontal axis, in mm) from the paraxial image surface along the optical axis AX, and along the vertical axis is taken the image height (Y', in mm). In the distortion diagrams (those with numbers suffixed with C), along the horizontal axis is taken the distortion (%) observed for the d-line, and along the vertical axis is taken the image height (Y', in mm).

TABLE 1

| Example 1 | Focal Length Condition | W | M | T |
|---|---|---|---|---|
| λ₀ [nm] = 587.56 (d-line) | f [mm] | 6.45 | 12.9 | 18.3825 |
| Y'max [mm] = 3.78 | Fno | 3.675 | 4.344 | 5.2 |

| i | ri [mm] | | di [mm] | Ni | vi | Element, etc. |
|---|---|---|---|---|---|---|
| 0 | ∞ | | ∞ | | | OB |
| 1 | 36.022 | | 0.800 | 1.66548 | 55.14 | L1 |
| 2 | 7.200 | * | 2.366 | | | GR1(−) |
| 3 | ∞ | | 8.000 | 2.00330 | 28.27 | PR |
| 4 | ∞ | | 1.060 | | | |

TABLE 1-continued

| 5 | −204.085 | | 0.850 | 1.48749 | 70.44 | L2 |
|---|---|---|---|---|---|---|
| 6 | 10.878 | | 0.010 | 1.51400 | 42.83 | |
| 7 | 10.878 | | 1.321 | 1.84863 | 31.32 | L3 |
| 8 | 33.417 | | 14.480 | # | | |
| 9 | ∞ | | 0.800 | | | ST |
| 10 | 10.500 | | 1.591 | 1.73739 | 52.16 | GR2(+) |
| 11 | −21.318 | | 1.021 | | | |
| 12 | −9.125 | | 1.134 | 1.62689 | 32.84 | |
| 13 | 12.736 | | 0.010 | 1.51400 | 42.83 | |
| 14 | 12.736 | | 2.861 | 1.49865 | 68.85 | |
| 15 | −8.246 | | 0.100 | | | |
| 16 | 20.141 | | 0.800 | 1.53048 | 55.72 | |
| 17 | 11.199 | * | 1.796 | # | | |
| 18 | −7.396 | * | 1.000 | 1.53048 | 55.72 | GR3(−) |
| 19 | −11.214 | * | 2.058 | # | | |
| 20 | 21.188 | * | 1.848 | 1.53048 | 55.72 | GR4(+) |
| 21 | −15.855 | | 0.808 | | | |
| 22 | −13.082 | | 0.800 | 1.81560 | 24.20 | |
| 23 | −14.804 | | 7.188 | # | | |
| 24 | ∞ | | 0.500 | 1.54426 | 69.60 | OF |
| 25 | ∞ | | 0.500 | | | |
| 26 | ∞ | | 0.500 | 1.51680 | 64.20 | |
| 27 | ∞ | | 0.800 | | | |
| 28 | ∞ | | | | | IM(SR) |

TABLE 2

Example 1

Aspherical Surface Data of i-th Surface (*)

| i | K | A4 | A6 |
|---|---|---|---|
| 2 | 0 | −8.351E−05 | −5.402E−06 |
| 17 | 0 | 4.554E−04 | 4.665E−06 |
| 18 | 0 | 1.371E−03 | −1.260E−05 |
| 19 | 0 | 1.110E−03 | −1.780E−05 |
| 20 | 0 | −5.904E−05 | 5.662E−06 |

| i | A8 | A10 | A12 |
|---|---|---|---|
| 2 | −1.945E−08 | 3.760E−09 | −1.105E−10 |
| 17 | 1.268E−06 | −7.947E−08 | 2.470E−09 |
| 18 | 6.382E−06 | −9.102E−07 | 3.224E−08 |
| 19 | 5.077E−06 | −6.347E−07 | 1.957E−08 |
| 20 | −4.165E−07 | 1.030E−08 | −1.672E−10 |

Variable Axial Distance Data di(#)

| i | W | M | T |
|---|---|---|---|
| 8 | 14.480 | 5.963 | 1.000 |
| 17 | 1.796 | 10.312 | 15.276 |
| 19 | 2.058 | 7.169 | 7.527 |
| 23 | 7.188 | 2.077 | 1.719 |

TABLE 3

| Example 2 | Focal Length Condition | W | M | T |
|---|---|---|---|---|
| λ₀ [nm] = 587.56 (d-line) | f [mm] | 6.45 | 1.29 | 18.3825 |
| Y'max [mm] = 3.78 | Fno | 3.675 | 4.0702 | 5.2 |

| i | ri [mm] | | di [mm] | Ni | vi | Element, etc. |
|---|---|---|---|---|---|---|
| 0 | ∞ | | ∞ | | | OB |
| 1 | −11.579 | * | 0.800 | 1.66548 | 55.14 | L1 |
| 2 | ∞ | | 0.000 | | | GR1(−) |
| 3 | ∞ | | 9.300 | 2.00330 | 28.27 | PR |
| 4 | ∞ | | 1.588 | | | |
| 5 | −15.328 | * | 0.753 | 1.49375 | 69.53 | L2 |
| 6 | 10.108 | | 0.011 | 1.51400 | 42.83 | |
| 7 | 10.108 | | 1.789 | 1.84909 | 33.77 | L3 |

TABLE 3-continued

| | | | | | |
|---|---|---|---|---|---|
| 8 | −382.072 | 14.255 | # | | |
| 9 | ∞ | 0.500 | | | ST |
| 10 | 10.115 | 1.087 | | 1.75468 | 51.54 | GR2(+) |
| 11 | 27.591 | 1.500 | | | |
| 12 | −11.335 | 0.800 | | 1.70546 | 27.19 | |
| 13 | 16.627 | 0.011 | | 1.51400 | 42.83 | |
| 14 | 16.627 | 1.698 | | 1.66199 | 55.35 | |
| 15 | −10.374 | 0.568 | | | |
| 16 | −11.473 | * | 1.032 | 1.52200 | 52.20 | |
| 17 | −8.407 | * | 0.500 | # | |
| 18 | −29.276 | 1.000 | | 1.49780 | 63.65 | GR3(−) |
| 19 | 794.413 | 2.005 | # | | |
| 20 | −10.000 | 0.800 | | 1.75000 | 25.14 | GR4(+) |
| 21 | −12.352 | 0.100 | | | |
| 22 | 24.745 | * | 2.664 | 1.52200 | 52.20 | |
| 23 | −11.032 | * | 7.743 | # | |
| 24 | −12.567 | 0.800 | | 1.52200 | 52.20 | GR5(−) |
| 25 | −18.370 | 0.500 | | | |
| 26 | ∞ | 1.400 | | 1.54426 | 69.60 | OF |
| 27 | ∞ | 0.500 | | | |
| 28 | ∞ | 0.500 | | 1.51680 | 64.20 | |
| 29 | ∞ | 0.800 | | | |
| 30 | ∞ | | | | IM(SR) |

TABLE 4

Example 2

Aspherical Surface Data of i-th Surface (*)

| i | K | A4 | A6 |
|---|---|---|---|
| 1 | −0.388438 | 4.114E−04 | 1.298E−06 |
| 5 | 0 | −4.916E−04 | 1.020E−06 |
| 16 | 0 | −1.207E−03 | 1.188E−05 |
| 17 | 0 | −7.152E−04 | 3.245E−06 |
| 22 | 0 | −2.265E−04 | −1.648E−06 |
| 23 | 0 | 2.165E−06 | −4.169E−06 |

| i | A8 | A10 | A12 |
|---|---|---|---|
| 1 | −7.665E−08 | 1.066E−09 | −4.990E−12 |
| 5 | −8.434E−07 | 4.252E−08 | −7.458E−10 |
| 16 | −2.810E−06 | 2.303E−07 | −5.232E−09 |
| 17 | −2.882E−07 | 2.223E−08 | 4.866E−10 |
| 22 | −1.031E−07 | 5.938E−09 | −2.673E−11 |
| 23 | 1.354E−07 | −2.041E−09 | 5.796E−11 |

Variable Axial Distance Data di(#)

| i | W | M | T |
|---|---|---|---|
| 8 | 14.255 | 4.458 | 0.800 |
| 17 | 0.500 | 10.297 | 13.955 |
| 19 | 2.005 | 6.290 | 8.947 |
| 23 | 7.743 | 3.458 | 0.800 |

TABLE 5

| Example 3 | Focal Length Condition | W | M | T |
|---|---|---|---|---|
| λ₀ [nm] = 587.56 (d-line) | f [mm] | 5.902 | 11.7977 | 16.8102 |
| Y'max [mm] = 3.5 | Fno | 2.6072 | 4.1795 | 5.1742 |

| i | ri [mm] | di [mm] | Ni | vi | Element, etc. |
|---|---|---|---|---|---|
| 0 | ∞ | ∞ | | | OB |
| 1 | 95.000 | 0.900 | 1.69350 | 53.31 | L1 |
| 2 | 8.037 | * | 2.683 | | | GR1(−) |
| 3 | ∞ | 10.500 | 2.00220 | 29.06 | PR |
| 4 | ∞ | 0.789 | | | |
| 5 | −39.297 | 0.800 | 1.69680 | 55.47 | L2 |
| 6 | 12.930 | 0.010 | 1.51400 | 42.83 | |

TABLE 5-continued

| | | | | | |
|---|---|---|---|---|---|
| 7 | 12.930 | 1.975 | 1.83400 | 37.35 | L3 |
| 8 | −39.271 | 18.494 | # | | |
| 9 | ∞ | 0.000 | | | ST |
| 10 | 10.742 | 1.515 | 1.77250 | 49.65 | GR2(+) |
| 11 | 18.163 | 0.200 | | | |
| 12 | 10.389 | 2.310 | 1.72916 | 54.66 | |
| 13 | −122.000 | 0.010 | 1.51400 | 42.83 | |
| 14 | −122.000 | 1.360 | 1.76182 | 26.61 | |
| 15 | 8.982 | 1.141 | | | |
| 16 | −45.431 | * | 1.650 | 1.53048 | 55.72 | |
| 17 | −13.697 | * | 1.877 | # | |
| 18 | −12.600 | 0.998 | 1.62004 | 36.30 | GR3(+) |
| 19 | 159.158 | 0.100 | | | |
| 20 | 11.694 | * | 4.000 | 1.53048 | 55.72 | |
| 21 | −8.729 | * | 6.304 | # | |
| 22 | −29.240 | 0.800 | 1.74330 | 49.23 | GR4(−) |
| 23 | ∞ | 0.075 | | | |
| 24 | ∞ | 1.280 | 1.54426 | 69.60 | OF |
| 25 | ∞ | 0.940 | | | |
| 26 | ∞ | 0.500 | 1.51680 | 64.20 | |
| 27 | ∞ | 0.800 | | | |
| 28 | ∞ | | | | IM(SR) |

TABLE 6

Example 3

Aspherical Surface Data of i-th Surface (*)

| i | K | A4 | A6 |
|---|---|---|---|
| 2 | 0 | −1.540E−04 | −1.912E−06 |
| 16 | 0 | −5.737E−04 | −6.385E−06 |
| 17 | 0 | −1.785E−04 | −2.153E−06 |
| 20 | 0 | −3.239E−04 | −8.583E−06 |
| 21 | 0 | 2.844E−04 | −1.551E−05 |

| i | A8 | A10 | A12 |
|---|---|---|---|
| 2 | 6.624E−08 | −3.376E−09 | −3.742E−11 |
| 16 | 1.282E−06 | −7.307E−09 | 0.000E+00 |
| 17 | 1.159E−06 | −9.813E−09 | 0.000E+00 |
| 20 | 5.453E−07 | −3.658E−08 | 3.612E−10 |
| 21 | 9.978E−07 | −4.715E−08 | 5.695E−10 |

Variable Axial Distance Data di(#)

| i | W | M | T |
|---|---|---|---|
| 8 | 18.494 | 7.721 | 2.000 |
| 17 | 1.877 | 15.905 | 22.576 |
| 21 | 6.304 | 3.049 | 2.099 |

TABLE 7

| Example 4 | Focal Length Condition | W | M | T |
|---|---|---|---|---|
| λ₀ [nm] = 587.56 (d-line) | f [mm] | 6 | 10.5 | 17.28 |
| Y'max [mm] = 3.5 | Fno | 2.8671 | 3.1844 | 3.8 |

| i | ri [mm] | di [mm] | Ni | vi | Element, etc. |
|---|---|---|---|---|---|
| 0 | ∞ | ∞ | | | OB |
| 1 | 29.199 | 0.800 | 1.84666 | 23.82 | L1 |
| 2 | 9.088 | 2.359 | | | GR1(+) |
| 3 | ∞ | 10.000 | 2.02200 | 29.06 | PR |
| 4 | ∞ | 0.356 | | | |
| 5 | 26.535 | 2.634 | 1.78800 | 49.20 | L2 |
| 6 | −18.142 | 0.700 | # | | |
| 7 | −17.378 | * | 1.500 | 1.52200 | 52.20 | GR2(−) |
| 8 | 5.753 | * | 1.008 | | |
| 9 | 6.962 | 2.439 | 1.84666 | 23.82 | |
| 10 | 9.258 | 11.147 | # | | |

TABLE 7-continued

| | | | | | |
|---|---|---|---|---|---|
| 11 | ∞ | 0.100 | | | ST |
| 12 | 31.382 | 1.120 | 1.75450 | 51.57 | GR3(+) |
| 13 | −187.707 | 5.600 | # | | |
| 14 | 7.640 | 7.516 | 1.75450 | 51.57 | GR4(+) |
| 15 | −9.000 | 0.010 | 1.51400 | 42.83 | |
| 16 | −9.000 | 1.000 | 1.84666 | 23.82 | |
| 17 | 8.421 * | 1.490 | # | | |
| 18 | 8.000 * | 2.684 | 1.52200 | 52.20 | GR5(+) |
| 19 | −85.136 * | 2.095 | # | | |
| 20 | ∞ | 1.500 | 1.51680 | 64.20 | OF |
| 21 | ∞ | 0.700 | | | |
| 22 | ∞ | 0.750 | 1.51680 | 64.20 | |
| 23 | ∞ | 1.190 | | | |
| 24 | ∞ | | | | IM(SR) |

TABLE 8

Example 4

Aspherical Surface Data of i-th Surface (*)

| i | K | A4 | A6 |
|---|---|---|---|
| 7 | 0 | −1.408E−04 | 3.286E−05 |
| 8 | 0 | −5.395E−04 | 8.747E−05 |
| 17 | 0 | 9.105E−04 | 3.035E−05 |
| 18 | 0 | −3.905E−04 | −1.072E−06 |
| 19 | 0 | −2.850E−04 | 8.110E−06 |

| i | A8 | A10 | A12 |
|---|---|---|---|
| 7 | −2.030E−06 | 4.542E−08 | 0.000E+00 |
| 8 | −8.401E−06 | 2.730E−07 | 0.000E+00 |
| 17 | 8.131E−07 | 9.223E−08 | 0.000E+00 |
| 18 | −3.443E−07 | −4.435E−08 | 0.000E+00 |
| 19 | −2.106E−06 | 1.744E−08 | 0.000E+00 |

Variable Axial Distance Data di(#)

| i | W | M | T |
|---|---|---|---|
| 6 | 0.700 | 6.497 | 10.163 |
| 10 | 11.147 | 5.350 | 1.683 |
| 13 | 5.600 | 3.414 | 0.300 |
| 17 | 1.490 | 3.456 | 7.786 |
| 19 | 2.095 | 2.315 | 1.100 |

TABLE 9

Example 5

| | Focal Length Condition | W | M | T |
|---|---|---|---|---|
| $\lambda_0$ [nm] = 587.56 (d-line) | f [mm] | 1.94 | 3.54 | 5.64 |
| Y'max [mm] = 1.17 | Fno | 2.54 | 3.89 | 5.06 |

| i | ri [mm] | di [mm] | Ni | νi | Element, etc. |
|---|---|---|---|---|---|
| 0 | ∞ | ∞ | | | OB |
| 1 | −4.479 * | 1.298 | 1.51250 | 63.75 | L1 |
| 2 | ∞ | 0.000 | | | GR1(−) |
| 3 | ∞ | 4.910 | 2.00330 | 28.27 | PR |
| 4 | ∞ | 5.549 # | | | |
| 5 | ∞ | 0.100 | | | ST |
| 6 | −3.303 * | 0.971 | 1.78831 | 47.32 | GR2(+) |
| 7 | −2.151 * | 1.871 | | | |
| 8 | 5.520 | 0.886 | 1.78831 | 47.32 | |
| 9 | −5.187 | 0.166 | | | |
| 10 | −14.422 | 0.850 | 1.79850 | 22.60 | |
| 11 | 1.860 | 0.451 # | | | |
| 12 | 3.736 * | 1.045 | 1.52510 | 56.34 | GR3(+) |
| 13 | −2.560 * | 0.873 # | | | |

TABLE 9-continued

| | | | | | |
|---|---|---|---|---|---|
| 14 | ∞ | 0.300 | 1.51680 | 64.20 | OF |
| 15 | ∞ | 0.500 | | | |
| 16 | ∞ | | | | IM(SR) |

TABLE 10

Example 5

Aspherical Surface Data of i-th Surface (*)

| i | K | A4 | A6 |
|---|---|---|---|
| 1 | 0 | −4.265E−03 | −6.465E−05 |
| 6 | 0 | −5.049E−02 | 1.253E−03 |
| 7 | 0 | −1.446E−02 | 1.311E−03 |
| 12 | 0 | 8.146E−03 | −7.796E−03 |
| 13 | 0 | 4.358E−02 | −1.796E−02 |

| i | A8 | A10 | A12 |
|---|---|---|---|
| 1 | 1.675E−05 | −1.041E−06 | 0.000E+00 |
| 6 | −1.517E−02 | 0.000E+00 | 0.000E+00 |
| 7 | −2.623E−03 | 0.000E+00 | 0.000E+00 |
| 12 | 1.520E−03 | −1.461E−05 | 0.000E+00 |
| 13 | 4.604E−03 | −3.292E−04 | 0.000E+00 |

Variable Axial Distance Data di(#)

| i | W | M | T |
|---|---|---|---|
| 4 | 5.649 | 2.862 | 0.131 |
| 11 | 0.451 | 3.604 | 6.322 |
| 13 | 0.873 | 0.507 | 0.520 |

TABLE 11

| | Conditional Formula (1). etc. | Conditional Formula (2). etc. | | |
|---|---|---|---|---|
| | Ndp | f1L | f1G | \|f1L/f1G\| |
| Example 1 | 2.00330 | −13.674 | −15.402 | 0.888 |
| Example 2 | 2.00330 | −17.399 | −20.722 | 0.840 |
| Example 3 | 2.00220 | −12.715 | −19.516 | 0.652 |
| Example 4 | 2.02200 | −15.874 | 21.859 | −0.726 |
| Example 5 | 2.00330 | −8.739 | −8.739 | 1.000 |

What is claimed is:

1. An image-taking lens apparatus comprising:
an image sensor for converting an optical image of a subject into an electrical signal; and
an image-taking lens system for forming the optical image on the image sensor, the image-taking lens system including a prism configured to bend an optical path approximately 90 degrees,
wherein the prism fulfills the following conditional formula:

Ndp>1.9 where
Ndp represents a refractive index for a d-line of the prism.

2. An image-taking lens apparatus as claimed in claim 1, wherein the image-taking lens system is a variable-focal-length imaging optical system.

3. An image-taking lens apparatus as claimed in claim 1, wherein the image-taking lens system includes at least one negative lens element on an object side of the prism.

4. An image-taking lens apparatus as claimed in claim 1, wherein the image-taking lens system includes an aperture stop or a shutter on an image side of the prism.

5. A zoom lens system that includes a plurality of lens units and that achieves zooming by varying distances between the lens units, the zoom lens system comprising:
a prism for bending an optical path,
wherein the prism fulfills the following conditional formula:

$$Ndp > 1.9$$

where
Ndp represents a refractive index for a d-line of the prism.

6. A zoom lens system as claimed in claim 5, wherein the prism reflects a light beam in such a way as to bend the optical path at approximately 90 degrees.

7. A zoom lens system as claimed in claim 5, further comprising:
at least one negative lens element disposed on an object side of the prism.

8. A zoom lens system as claimed in claim 5, wherein the prism is included in a most object-side lens unit 9. A zoom lens system as claimed in claim 8, wherein the most object-side lens unit includes at least one lens element on the image side of the prism.

10. A zoom lens system as claimed in claim 9, wherein the most object-side lens unit includes at least one positive lens element on the image side of the prism.

11. A zoom lens system as claimed in claim 8, wherein the most object-side lens unit includes at least one positive lens element and at least one negative lens element on the image side of the prism.

12. A zoom lens system as claimed in claim 5, wherein the prism is included in a most object-side lens unit, and wherein the most object-side lens unit includes a first lens element located on the object side of the prism and fulfills the following conditional formula:

$$0.4 < |fIL/fIG| < 1.2$$

where
fIL represents a focal length of the first lens element (fIL<0); and
fIG represents a focal length of the first lens unit.

13. A zoom lens system as claimed in claim 5, further comprising:
a light amount adjusting member.

14. A zoom lens system as claimed in claim 13, wherein:
the light amount adjusting member is an aperture stop or a shutter disposed on an image side of the prism.

15. A digital camera comprising:
an image sensor for converting an optical image of a subject into an electrical signal; and
an image-taking lens system for forming the optical image on the image sensor, the image-taking lens system including a prism configured to bend an optical path approximately 90 degrees,
wherein the prism fulfills the following conditional formula:

$$Ndp > 1.9$$

where
Ndp represents a refractive index for a d-line of the prism.

16. A digital camera as claimed in claim 15, wherein the image-taking lens system is a variable-focal-length imaging optical system.

17. A digital camera as claimed in claim 15, wherein the image-taking lens system includes at least one negative lens element on an object side of the prism.

18. A digital camera as claimed in claim 15, wherein the image-taking lens system includes an aperture stop or a shutter on an image side of the prism.

* * * * *

UNITED STATES PATENT AND TRADEMARK OFFICE
CERTIFICATE OF CORRECTION

PATENT NO.        : 7,227,706 B2
APPLICATION NO.   : 11/029332
DATED             : June 5, 2007
INVENTOR(S)       : Genta Yagyu et al.

It is certified that error appears in the above-identified patent and that said Letters Patent is hereby corrected as shown below:

Column 18:
Line 47, delete "wide-angel" and insert -- wide-angle --.

Column 26:
Line 9, delete "the first lens unit." and insert -- the most object-side lens unit. --.

Signed and Sealed this

Seventh Day of August, 2007

JON W. DUDAS
*Director of the United States Patent and Trademark Office*